(12) United States Patent
Iwabuchi et al.

(10) Patent No.: US 11,473,493 B2
(45) Date of Patent: Oct. 18, 2022

(54) CONTROL METHOD AND CONTROL DEVICE OF INTERNAL COMBUSTION ENGINE

(71) Applicants: NISSAN MOTOR CO., LTD., Yokohama (JP); RENAULT s.a.s., Boulogne-Billancourt (FR)

(72) Inventors: Yoshihiko Iwabuchi, Kanagawa (JP); Daisuke Tanaka, Kanagawa (JP); Ryo Uchida, Kanagawa (JP)

(73) Assignees: NISSAN MOTOR CO., LTD., Yokohama (JP); RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 15/774,617

(22) PCT Filed: Nov. 10, 2015

(86) PCT No.: PCT/JP2015/081651
§ 371 (c)(1),
(2) Date: May 9, 2018

(87) PCT Pub. No.: WO2017/081755
PCT Pub. Date: May 18, 2017

(65) Prior Publication Data
US 2018/0328262 A1 Nov. 15, 2018

(51) Int. Cl.
*F02B 23/10* (2006.01)
*F02M 61/14* (2006.01)
(Continued)

(52) U.S. Cl.
CPC .............. *F02B 23/10* (2013.01); *F02D 9/08* (2013.01); *F02D 35/023* (2013.01);
(Continued)

(58) Field of Classification Search
CPC ...... F02B 1/02; F02B 17/005; F02B 23/0669; F02B 23/10; F02B 23/101;
(Continued)

(56) References Cited

U.S. PATENT DOCUMENTS 3,572,298 A * 3/1971 Onishi et al. .......... F02B 17/005
123/301
4,733,642 A * 3/1988 Ishida ...................... F02B 1/12
123/263
(Continued)

FOREIGN PATENT DOCUMENTS

DE 102006037413 B4 * 5/2008 ............ F02B 31/085
DE 10 2009 002 323 A1 12/2009
(Continued)

OTHER PUBLICATIONS

Office Action dated Jun. 8, 2020 issued in corresponding Indian Patent Application No. 201847017703 (6 pages).

*Primary Examiner* — John M Zaleskas
(74) *Attorney, Agent, or Firm* — Faegre Drinker Biddle & Reath LLP

(57) ABSTRACT

In a control method of an internal combustion engine including a fuel injection valve having a plurality of injection holes and adapted to directly inject a fuel into a cylinder and an ignition plug adapted to generate a plug discharging channel, after fuel injection is performed, spark ignition is performed while turbulence in an air flow is generated by the fuel injection by an ignition plug disposed so that a discharging region is sandwiched by fuel sprays injected from the two adjacent injection holes and located within a range where the turbulence in the air flow is generated.

5 Claims, 24 Drawing Sheets

(51) Int. Cl.
*F02P 5/15* (2006.01)
*F02M 61/18* (2006.01)
*F02P 5/04* (2006.01)
*F02D 9/08* (2006.01)
*F02P 13/00* (2006.01)
*F02D 35/02* (2006.01)
*F02D 41/14* (2006.01)
*F02D 41/40* (2006.01)

(52) U.S. Cl.
CPC ....... *F02D 41/1498* (2013.01); *F02D 41/403* (2013.01); *F02M 61/14* (2013.01); *F02M 61/1806* (2013.01); *F02P 5/045* (2013.01); *F02P 5/15* (2013.01); *F02P 13/00* (2013.01); *F02B 2023/103* (2013.01); *F02B 2023/106* (2013.01); *F02B 2275/48* (2013.01); *F02D 2250/31* (2013.01); *Y02T 10/12* (2013.01)

(58) Field of Classification Search
CPC .......... F02B 2023/102; F02B 2023/103; F02B 2023/106; F02B 2075/125; F02B 2275/14; F02M 61/1806; F02M 61/1813
USPC ........................................................ 123/305
See application file for complete search history.

(56) References Cited

U.S. PATENT DOCUMENTS

| | | | | | |
|---|---|---|---|---|---|
| 4,852,525 | A | * | 8/1989 | Ishida | F02B 23/104 123/260 |
| 5,170,758 | A | * | 12/1992 | Chmela | F02B 23/104 123/276 |
| 5,983,853 | A | * | 11/1999 | Roessler | F02M 51/0603 123/295 |
| 6,227,164 | B1 | * | 5/2001 | Miller | F02B 77/13 123/298 |
| 6,715,463 | B2 | * | 4/2004 | Kudo | F02B 17/005 123/261 |
| 6,725,828 | B1 | * | 4/2004 | Han | F02B 23/101 123/295 |
| 6,971,365 | B1 | * | 12/2005 | Najt | F02D 41/3041 123/305 |
| 2002/0002963 | A1 | * | 1/2002 | Bertsch | F02B 17/005 123/299 |
| 2002/0134344 | A1 | * | 9/2002 | Sebastian | F02B 23/101 123/260 |
| 2002/0170533 | A1 | * | 11/2002 | Ziegler | F02B 23/101 123/305 |
| 2003/0145823 | A1 | * | 8/2003 | Wirth | F02B 23/101 123/301 |
| 2004/0011324 | A1 | * | 1/2004 | Arndt | F02B 23/104 123/299 |
| 2004/0011326 | A1 | * | 1/2004 | Yamashita | F02M 45/02 123/305 |
| 2004/0020459 | A1 | * | 2/2004 | Arndt | F02B 23/104 123/305 |
| 2004/0211388 | A1 | * | 10/2004 | Hiraya | F02B 23/101 123/276 |
| 2005/0139191 | A1 | * | 6/2005 | Tanaka | F02B 23/101 123/305 |
| 2005/0252483 | A1 | * | 11/2005 | Ganz | F02B 17/00 123/299 |
| 2005/0257769 | A1 | * | 11/2005 | Li | F02B 7/06 123/299 |
| 2006/0185351 | A1 | * | 8/2006 | Eves | F02D 41/024 60/285 |
| 2006/0191511 | A1 | * | 8/2006 | Mifuji | F02M 61/162 123/305 |
| 2007/0006843 | A1 | * | 1/2007 | Gansert | F02B 23/101 123/305 |
| 2007/0068482 | A1 | * | 3/2007 | Yamashita | F02B 23/105 123/298 |
| 2008/0210199 | A1 | * | 9/2008 | Zeng | F02M 61/184 123/445 |
| 2009/0126682 | A1 | * | 5/2009 | Ashizawa | F02D 41/0245 123/299 |
| 2010/0175660 | A1 | * | 7/2010 | Nishimoto | F02B 23/104 123/305 |
| 2010/0237174 | A1 | * | 9/2010 | Oomori | F02B 23/104 239/533.12 |
| 2010/0320293 | A1 | * | 12/2010 | Ogura | F02M 51/0685 239/533.12 |
| 2011/0277727 | A1 | * | 11/2011 | Hay | F02B 23/0651 123/305 |
| 2012/0255517 | A1 | * | 10/2012 | Grover, Jr. | F02D 13/0219 123/299 |
| 2013/0181068 | A1 | * | 7/2013 | Dantes | F02M 61/1813 239/557 |
| 2014/0069393 | A1 | * | 3/2014 | Yarino | F02B 23/104 123/478 |
| 2014/0137842 | A1 | * | 5/2014 | Yarino | F02B 23/104 123/472 |
| 2014/0251261 | A1 | * | 9/2014 | Boecking | F02M 61/1833 123/294 |
| 2015/0020768 | A1 | * | 1/2015 | Yi | F02B 23/104 123/305 |
| 2016/0258346 | A1 | * | 9/2016 | Kitazume | F02B 23/105 |
| 2018/0010511 | A1 | * | 1/2018 | Haibara | F02M 61/1806 |
| 2018/0163687 | A1 | * | 6/2018 | Tanaka | F02D 37/02 |

FOREIGN PATENT DOCUMENTS

| | | | |
|---|---|---|---|
| DE | 10 2009 002 323 A1 | 12/2009 | |
| EP | 1517017 A1 * | 3/2005 | ............ F02B 23/101 |
| EP | 1 775 439 A1 | 4/2007 | |
| EP | 3 376 019 A1 | 9/2018 | |
| JP | 02199218 A * | 8/1990 | .......... F02B 23/0657 |
| JP | H10-103175 A | 4/1998 | |
| JP | 2003-227381 A | 8/2003 | |
| JP | 2003-322049 | 11/2003 | |
| JP | 2004036554 A * | 2/2004 | ............ F02B 17/005 |
| JP | 2005256629 A * | 9/2005 | |
| JP | 2005273552 A * | 10/2005 | |
| JP | 2005273554 A * | 10/2005 | |
| JP | 2006-274946 A | 10/2006 | |
| JP | 2006274946 A * | 10/2006 | |
| JP | 2006-322392 A | 11/2006 | |
| JP | 2007177744 A * | 7/2007 | ............ F02B 23/101 |
| JP | 2007231924 A * | 9/2007 | ......... F02M 51/0675 |
| JP | 2007-278233 A | 10/2007 | |
| JP | 2007321619 A * | 12/2007 | |
| JP | 2008208817 A * | 9/2008 | ......... F02M 61/1813 |
| JP | 2008-267318 A | 11/2008 | |
| JP | 2008-273423 A | 11/2008 | |
| JP | 2008267252 A * | 11/2008 | |
| JP | 2009-85012 A | 4/2009 | |
| JP | 2010-196506 A | 9/2010 | |
| JP | 2011094604 A * | 5/2011 | |
| JP | 2011106377 A * | 6/2011 | |
| JP | 2012-241592 A | 12/2012 | |
| JP | 2012241592 A * | 12/2012 | ......... F02D 41/3041 |
| JP | 2014-532835 A | 12/2014 | |
| JP | 2015-200183 A | 11/2015 | |

* cited by examiner

COMBUSTION CHAMBER
WALL SURFACE

CONTROL METHOD AND CONTROL DEVICE OF INTERNAL COMBUSTION ENGINE

TECHNICAL FIELD

The present invention relates to a control method and a control device of an internal combustion engine.

BACKGROUND ART

JP2009-85012A discloses improvement of homogeneity of a mixture in a cylinder by performing main fuel injection during an intake stroke and by performing sub fuel injection during a compression stroke so as to reinforce tumble flow.

SUMMARY OF INVENTION

However, the tumble flow is gradually weakened as the compression stroke progresses and is broken in the end and thus, even if the tumble flow is reinforced as in the aforementioned document, the tumble flow cannot be maintained till ignition timing easily. Then, the weaker a gas flow in the cylinder is at the ignition timing, the lower the combustion stability becomes. That is, the homogeneity of the mixture in the cylinder can be improved by reinforcing the tumble flow as in the aforementioned document, but even if the mixture is homogenized, reliable ignition cannot be expected without sufficient extension of a plug discharging channel at a plug ignition.

An object of the present invention is to improve ignitability in an in-cylinder direct-injection internal combustion engine.

According to one embodiment of the present invention, a control method of an internal combustion engine comprising a fuel injection valve having a plurality of injection holes and adapted to directly inject a fuel into a cylinder and an ignition plug adapted to ignite the injected fuel is provided. In the control method, fuel injection is performed from the fuel injection valve and spark ignition is performed while turbulence in an air flow is generated by the fuel injection by the ignition plug disposed so that a discharging region is sandwiched by fuel sprays injected from the two adjacent injection holes and is located within a range where the turbulence in the air flow is generated.

DESCRIPTION OF EMBODIMENTS

Embodiments of the present invention will be explained below by referring to the attached drawings and the like.

First Embodiment

Figure 1:
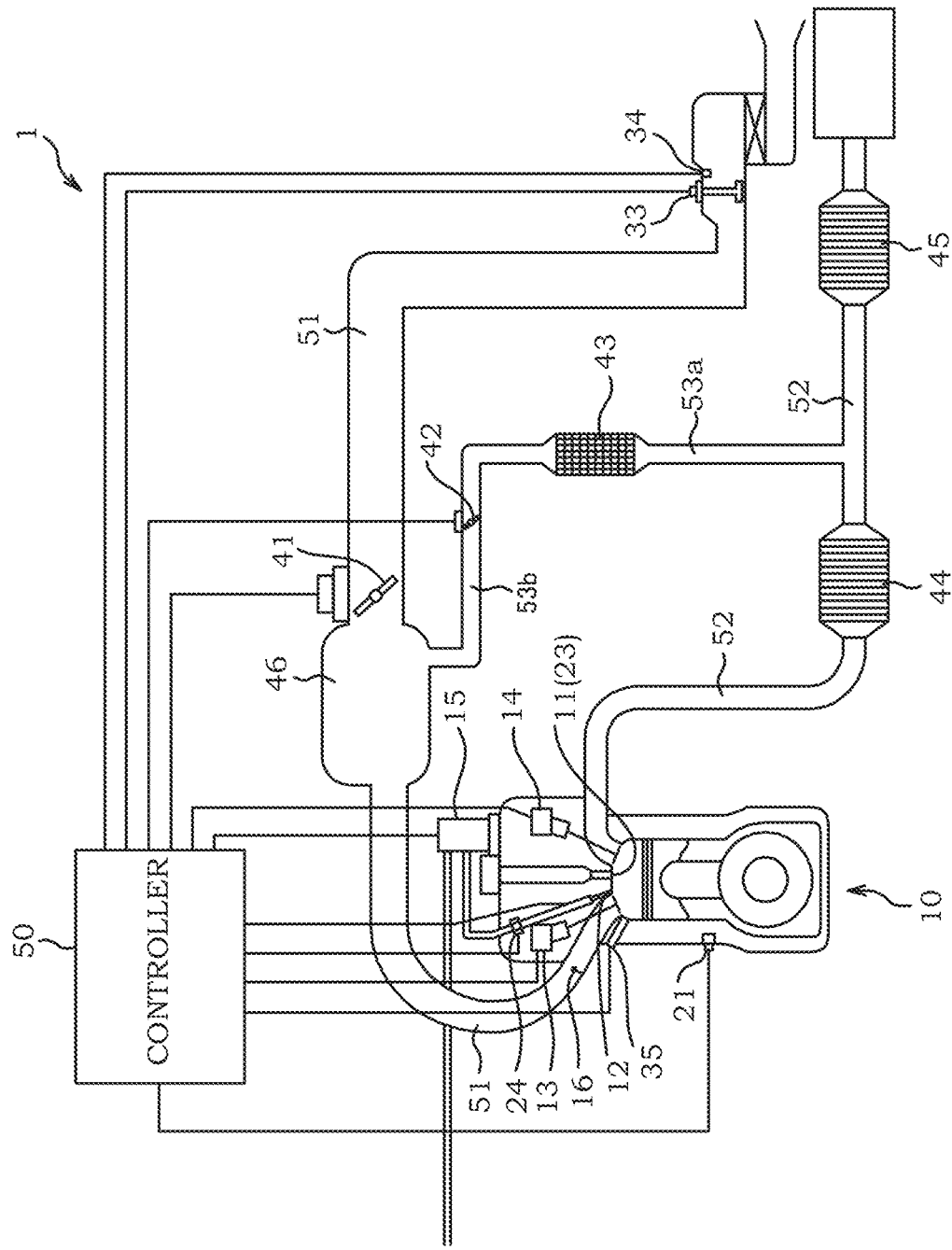
FIG. 1 is an explanatory view of entire configuration of an internal combustion engine system.

FIG. 1 is an explanatory view of entire configuration of an internal combustion engine system. In the internal combustion engine system 1, an internal combustion engine 10 is connected to an intake passage 51. The internal combustion engine 10 is also connected to an exhaust passage 52.

In the intake passage 51, a tumble control valve 16 is provided. The tumble control valve 16 generates tumble fluidity in a cylinder by closing a part of a channel section of the intake passage 51.

In the intake passage 51, a collector tank 46 is provided. To the collector tank 46, an EGR passage 53b is connected.

In the intake passage 51, an air flow meter 33 is provided. A controller 50 connected to the air flow meter 33 obtains an intake amount in the intake passage 51 from an air flow meter 33. Moreover, in the intake passage 51, an intake temperature sensor 34 is provided. The controller 50 connected to the intake temperature sensor 34 obtains a temperature of an air passing through the intake passage 51 from the intake temperature sensor 34.

Moreover, in the intake passage 51, an electronic control throttle 41 is provided, and throttle opening is controlled by the controller 50.

In the exhaust passage 52, exhaust gas purifying catalyst 44 and 45 for exhaust purification are provided. Three-way catalysts or the like are used for the exhaust gas purifying catalyst 44 and 45. The exhaust passage 52 branches to an EGR passage 53 connected to the collector tank 46 in the middle.

In the EGR passage 53, an EGR cooler 43 is provided. In the EGR passage 53, an EGR valve 42 is provided. The EGR valve 42 is connected to the controller 50. Then, opening of the EGR valve 42 is controlled by the controller 50 in accordance with an operation condition of the internal combustion engine 10.

The internal combustion engine 10 includes an ignition plug 11, a fuel injection valve 12, an intake-side valve timing control mechanism 13, an exhaust-side valve timing control mechanism 14, and a fuel injection pump 15. The fuel injection valve 12 is a right-above injection valve and is provided in the vicinity of the ignition plug 11.

The ignition plug 11 performs spark ignition in a combustion chamber of the internal combustion engine 10. The ignition plug 11 is connected to the controller 50, and spark ignition timing is controlled by the controller 50. The ignition plug 11 is also operated as a flow velocity senor 23 as will be described later. A method of detecting a flow velocity will be described later.

The fuel injection valve 12 directly injects a fuel into the combustion chamber of the internal combustion engine 10. The fuel injection valve 12 is connected to the controller 50 so that fuel injection timing is controlled. In this embodiment, so-called multi-stage injection in which fuel injection including the intake stroke is performed several times is performed. The fuel injection pump 15 supplies a pressurized fuel to a fuel supply pipeline connected to this fuel injection valve 12.

The intake-side valve timing control mechanism 13 changes opening/closing timing of an intake valve. The exhaust-side valve timing control mechanism 14 changes the opening/closing timing of an exhaust valve. The intake-side valve timing control mechanism 13 and the exhaust-side valve timing control mechanism 14 are connected to the controller 50. Then, their opening/closing timing is controlled by the controller 50. Here, the intake-side valve timing control mechanism 13 and the exhaust-side valve timing control mechanism 14 are shown, but either one of them may be provided.

In the internal combustion engine 10, a crank angle sensor 27 and an in-cylinder pressure sensor 35 are provided. The crank angle sensor 27 detects a crank angle in the internal combustion engine 10. The crank angle sensor 26 is connected to the controller 50 and sends a crank angle of the internal combustion engine 10 to the controller 50.

The in-cylinder pressure sensor 35 detects a pressure of the combustion chamber in the internal combustion engine 10. The in-cylinder pressure sensor 35 is connected to the controller 50. Then, it sends a pressure in the combustion chamber in the internal combustion engine 10 to the controller 50.

Moreover, the internal combustion engine 10 may include a knock sensor 21 and a combustion pressure sensor 24. The controller 50 reads outputs of the aforementioned various sensors and the other sensors, not shown, and controls ignition timing, valve timing, an air-fuel ratio and the like on the basis of them. Furthermore, the controller 50 executes plug discharging channel extension control which will be described later.

Figure 2:
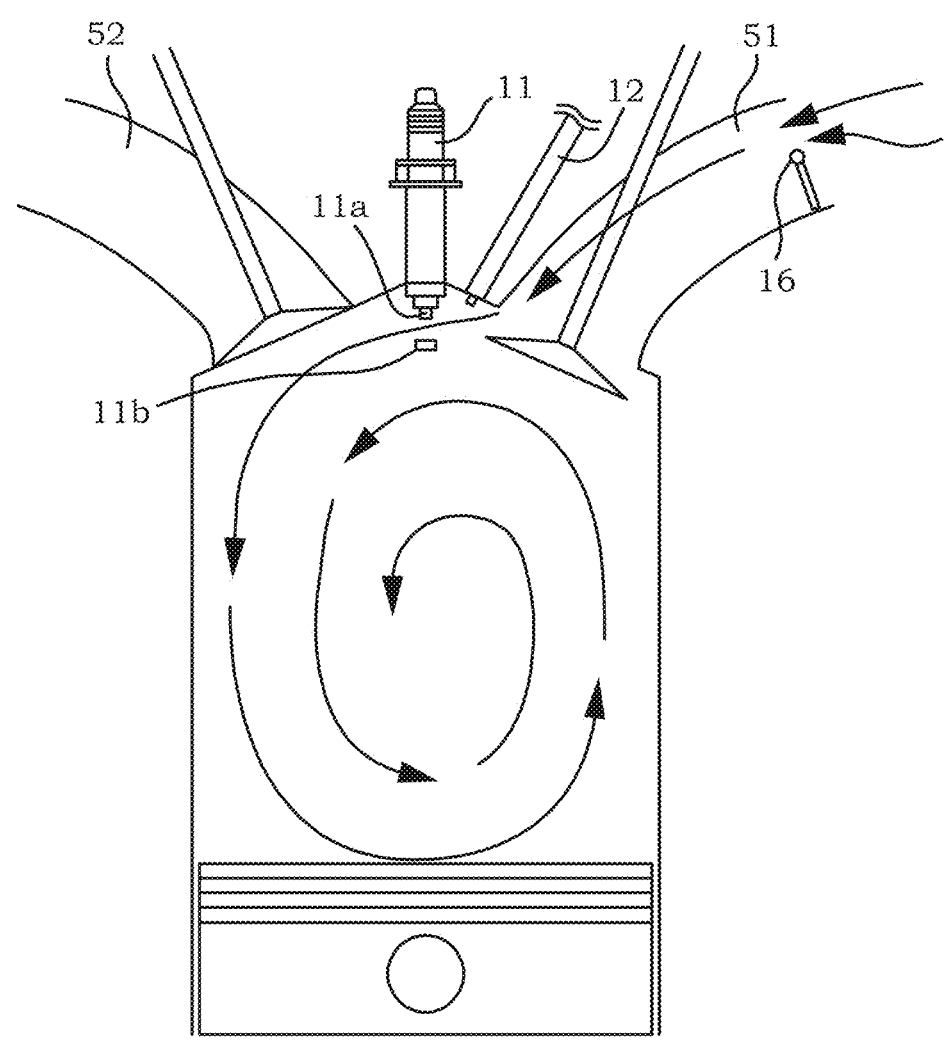
FIG. 2 is an explanatory view of a tumble flow generated in a cylinder.
Figure 3:
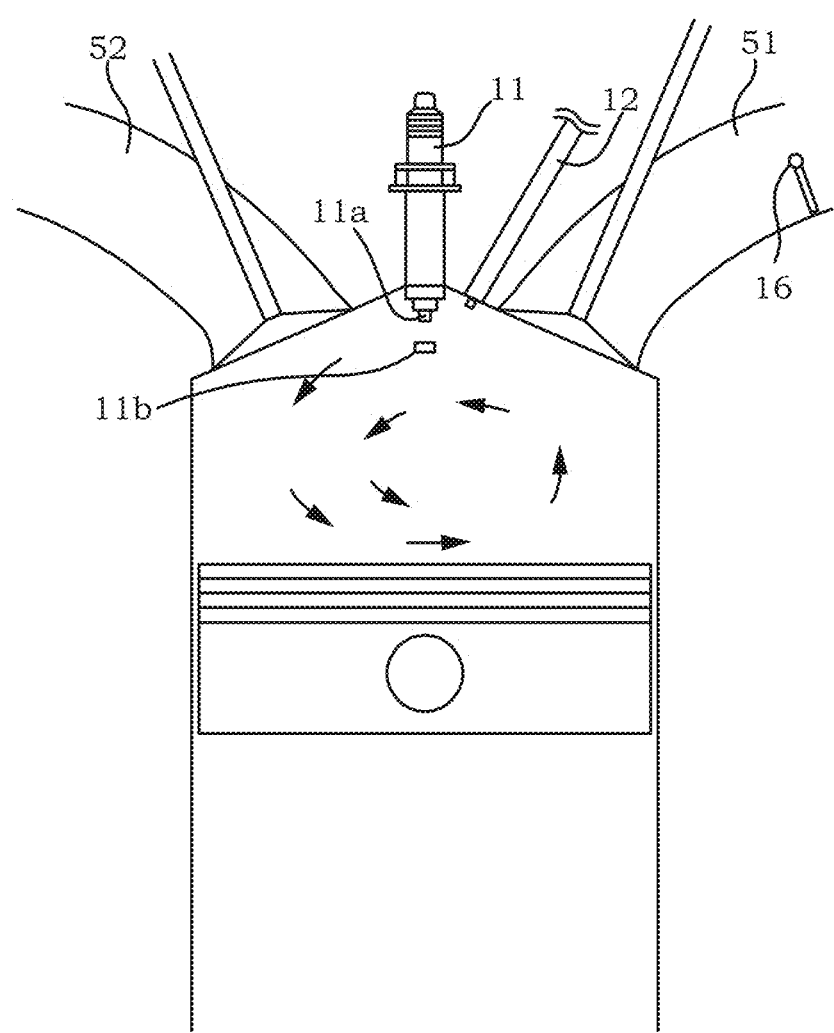
FIG. 3 is an explanatory view of breakage of the tumble flow.

FIG. 2 is an explanatory view of tumble fluidity generated in the cylinder. FIG. 3 is an explanatory view of tumble fluidity breakage. In these figures, the intake passage 51, the exhaust passage 52, the ignition plug 11, the fuel injection valve 12, and a tumble control valve 16 are illustrated. Moreover, a center electrode 11a and an outer electrode 11b of the ignition plug 11 are illustrated. Furthermore, in FIG. 2, the tumble fluidity in the cylinder in the intake stroke is indicated by an arrow. In FIG. 3, the tumble fluidity in the cylinder in the compression stroke is indicated by an arrow.

In the intake stroke, when the tumble control valve 16 is closed, the intake flows closer to an upper side in the figure of the intake passage 51 and flows into the cylinder. As a result, tumble fluidity turning in a vertical direction is formed in the cylinder as illustrated. After that, with a rise of a piston in the compression stroke, the combustion chamber in the cylinder is narrowed. When the combustion chamber is narrowed, the tumble fluidity is crushed, and maintaining of the fluidity gradually becomes difficult (FIG. 3) and is broken in the end.

While the tumble fluidity is maintained, a mixture of the fuel and the intake is promoted. Thus, the mixture in the cylinder is homogenized after the breakage of the tumble fluidity. However, after the breakage of the tumble fluidity, the fluidity is weakened in the cylinder, and a plug discharging channel CN is no longer sufficiently extended at plug ignition. Particularly, if the fluidity in the vicinity of the ignition plug weakens, a flame core generated by spark ignition cannot grow easily, which causes misfire or partial burn easily.

Figure 4A:
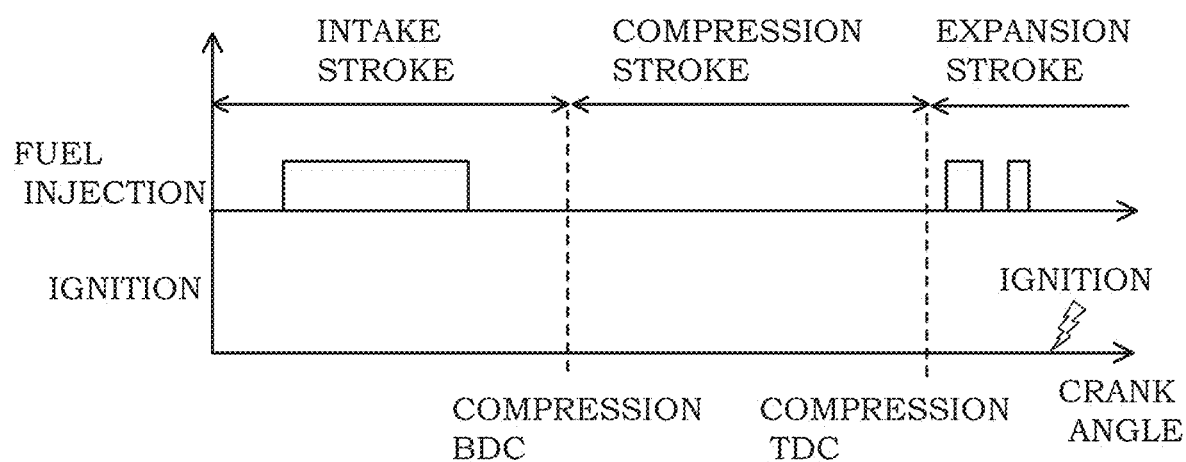
FIG. 4A is a view illustrating a relationship between fuel injection timing and ignition timing.
Figure 4B:
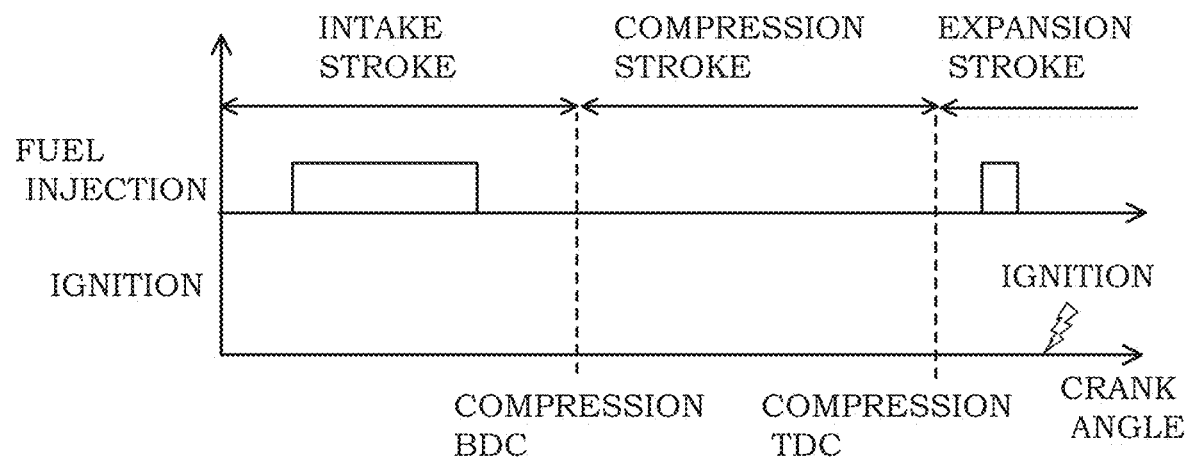
FIG. 4B is a view illustrating a relationship between fuel injection timing and ignition timing.

Thus, in this embodiment, fluidity is imparted to the vicinity of the ignition plug at timing in the vicinity of ignition so that the plug discharging channel CN is sufficiently extended at the plug ignition after the compression top dead center. Specifically, in addition to the intake stroke and an expansion stroke in the multi-stage injection, the fuel injection may be further performed during a period after breakage of the tumble fluidity to generation of the plug discharging channel (FIG. 4A) or the expansion stroke injection of the multi-stage injection may be performed during a period after the breakage of the tumble fluidity to the generation of the plug discharging channel (FIG. 4B). However, considering a possibility of adhesion of a part of the spray to the electrodes 11a and 11b of the ignition plug 11 due to turbulence in an air flow in the fuel spraying which will be described later, a small amount (approximately 10% of the total injection amount) of the fuel is preferably injected only for extending the plug discharging channel CN after the expansion stroke injection as in FIG. 4A.

The "plug discharging channel" here means an arc generated between electrodes 11a and 11b of the ignition plug. Since the fuel injection valve 12 is disposed in the vicinity of the ignition plug 11, a part of the injected fuel passes in the vicinity of the ignition plug 11. As a result, fluidity is imparted to the vicinity of the ignition plug 11.

Moreover, by imparting fluidity so that the plug discharging channel is extended, growth of the flame core is promoted, whereby further improvement of combustibility is expected. The extension of the plug discharging channel will be described later.

Figure 5:
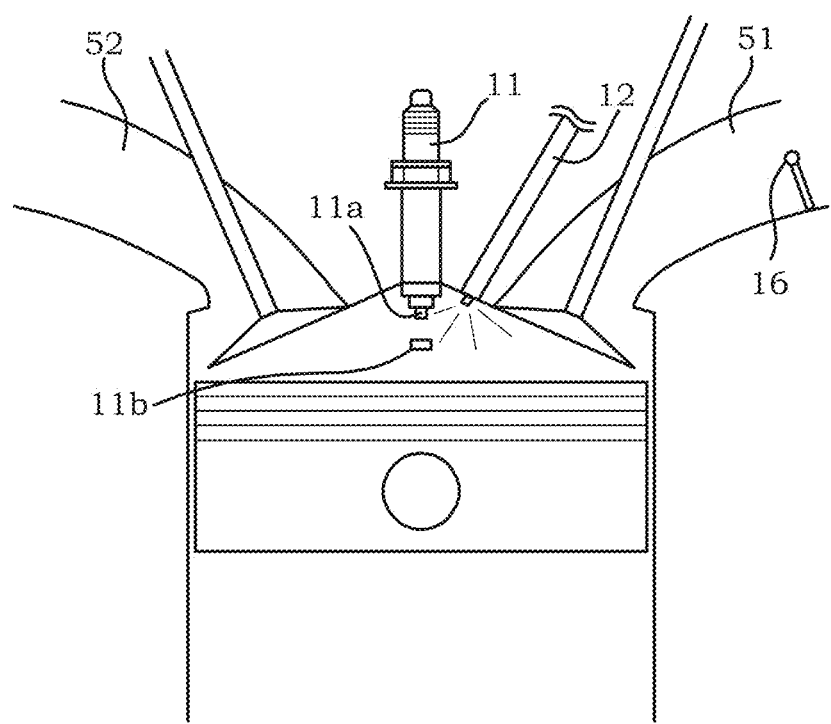
FIG. 5 is an explanatory view of fluidity imparting in the vicinity of a plug.

FIG. 5 is an explanatory view of fluidity imparting in the vicinity of the plug. As described above, the fuel injection valve 12 is a right-above injection valve and is provided in the vicinity of the ignition plug 11. Thus, a part of the injected fuel passes in the vicinity of a discharging gap. Thus, fuel injection is performed after the tumble fluidity is broken, and the fluidity can be imparted to the vicinity of the ignition plug. A form of fuel spray injected from the fuel injection valve 12 and a positional relationship between the fuel spray and the ignition plug 11 will be described later.

Figure 6:
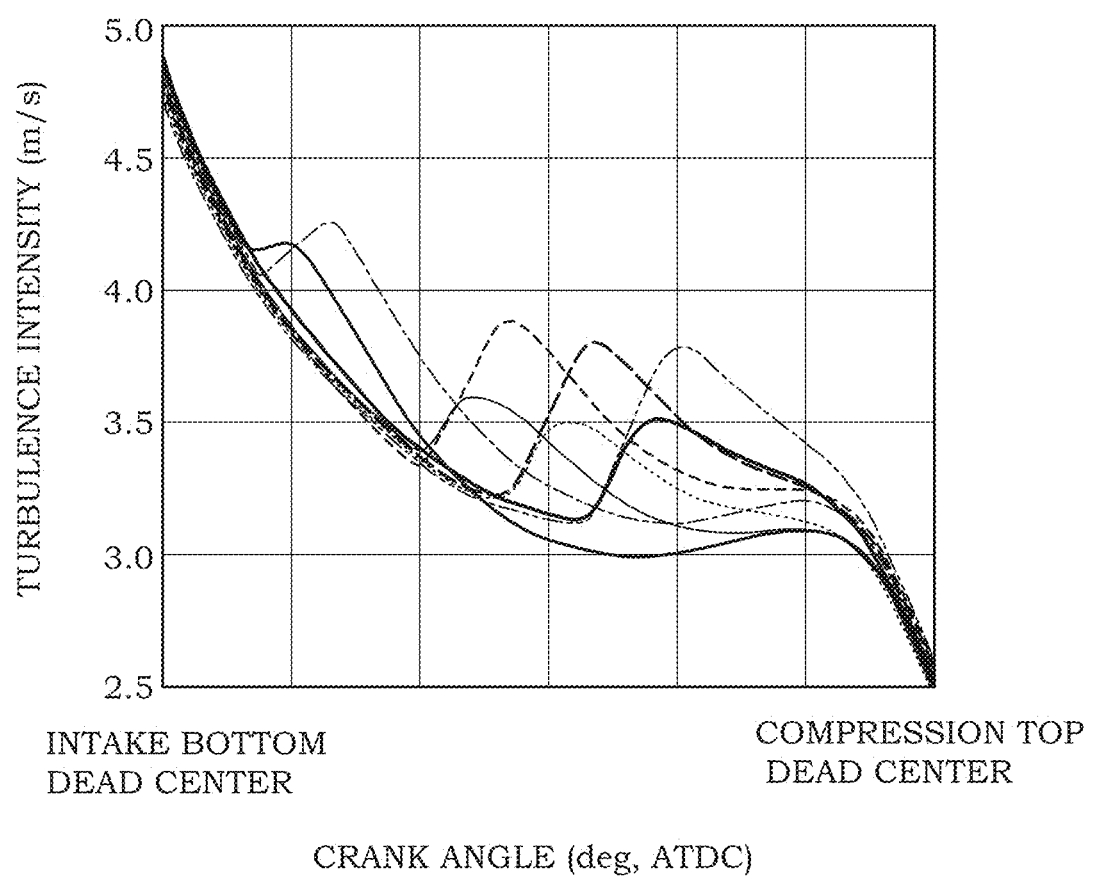
FIG. 6 is an explanatory view of an increase in a turbulent flow by a fuel injection valve.

FIG. 6 is an explanatory view of an increase in turbulence by a fuel injection valve. FIG. 6 illustrates turbulence intensity in the cylinder when the fuel injection is performed at arbitrary timing. In a graph in FIG. 6, a lateral axis indicates a crank angle from an intake bottom dead center to a compression top dead center, and a vertical axis indicates turbulence intensity. The tumble fluidity is broken in the compression stroke as described above. Thus, the turbulence intensity gradually weakens in the compression stroke. However, as illustrated in FIG. 6, it is known that the turbulence intensity can be increased by performing fuel injection at arbitrary timing. That is, fluidity can be imparted by performing the fuel injection.

Figure 7:
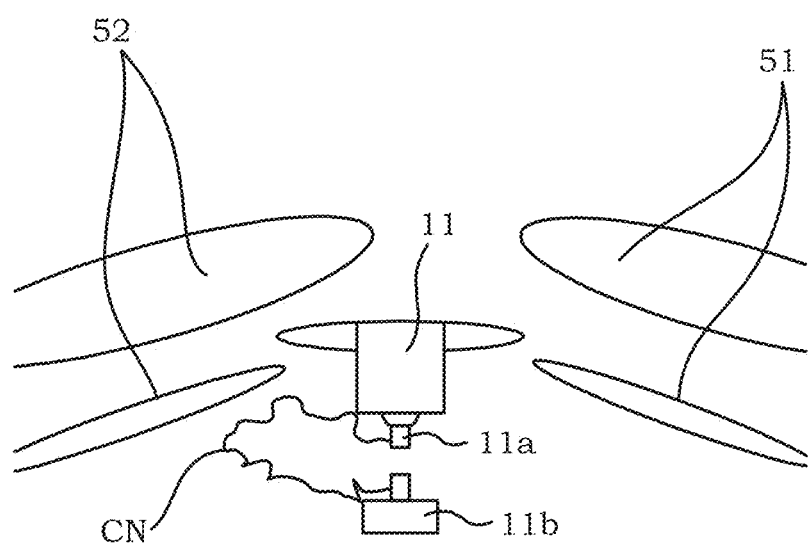
FIG. 7 is an explanatory view of a plug discharging channel in the vicinity of an ignition plug.

FIG. 7 is an explanatory view of the plug discharging channel in the vicinity of the ignition plug. FIG. 7 illustrates the center electrode 11*a* and the outer electrode 11*b* of the ignition plug 11. Moreover, the extended plug discharging channel CN is illustrated. Here, in order to draw attention to a state of the plug discharging channel CN, the fuel injection valve 12 is omitted, but it is provided closer to the intake passage 51 similarly to FIG. 5 described above. If fluidity can be imparted to the vicinity of the ignition plug so that the plug discharging channel CN is sufficiently extended, the distal end of fuel injection valve 12 does not necessarily have to be directed to the ignition plug 11, but an embodiment can be such that the distal end is directed to a different direction but reflection in the combustion chamber imparts fluidity to the vicinity of the ignition plug.

The fluidity in the vicinity of the ignition plug 11 after the tumble fluidity is broken is small. Thus, when spark ignition is performed, the plug discharging channel CN is usually generated across the center electrode 11*a* and the outer electrode 11*b* substantially linearly. However, in this embodiment, during a period after breakage of the tumble fluidity to generation of the plug discharging channel CN, the fluidity is imparted to the vicinity of the ignition plug 11 by the fuel injection by the fuel injection valve 12. Then, by means of the imparted fluidity, the plug discharging channel CN between the center electrode 11*a* and the outer electrode 11*b* is extended as illustrated in FIG. 7.

By configuring as above, the plug discharging channel CN can be extended by imparting fluidity into the combustion chamber after the breakage of the tumble fluidity and thus, partial burn and misfire can be suppressed and combustion stability can be improved. Particularly, even under circumstances in which flame propagation combustion is less easy than usual such as a case where the EGR is used or lean-burn is employed as described later, spark ignition can be performed stably.

Subsequently, a form of fuel spray injected from the fuel injection valve 12 and the positional relationship between the fuel spray and the ignition plug 11 will be explained.

Figure 8:
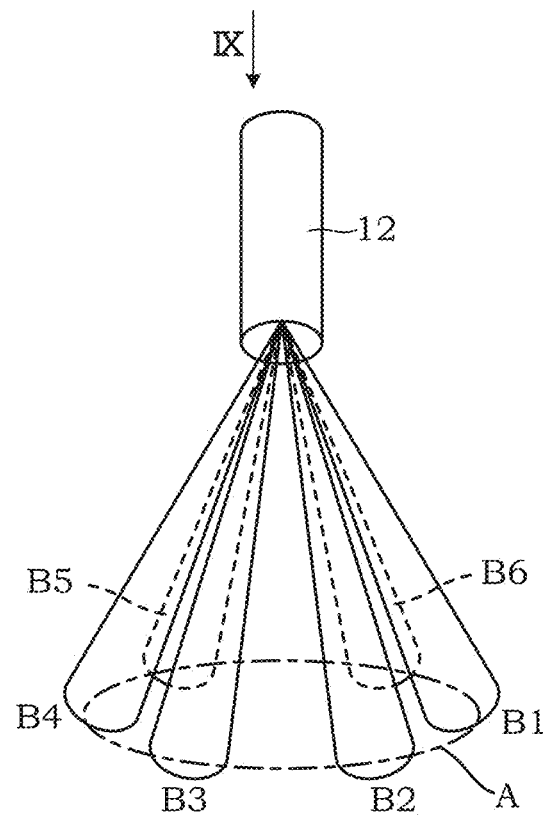
FIG. 8 is a view illustrating an injection form of a fuel injection valve.
Figure 9:
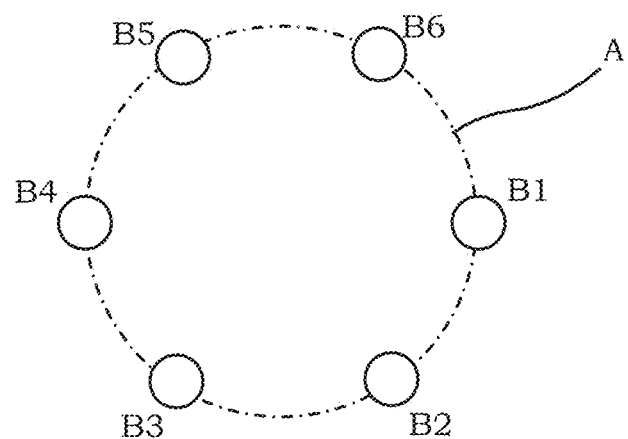
FIG. 9 is a view for explaining a spray beam.

FIG. 8 illustrates a form of the fuel spray injected from the fuel injection valve 12. FIG. 9 is a view of a plane including a circle A in FIG. 8 when seen from an arrow IX direction in FIG. 8.

In the fuel injection valve 12 in this embodiment, the fuel is injected from six injection holes. Assuming that the fuel sprays injected from the six injection holes (hereinafter, also referred to as a spray beam) are B1 to B6, each of the spray beams has a conical shape in which a spray section gets wider as it goes farther from the injection hole. Moreover, a section obtained by cutting the spray beams B1 to B6 on a plane including the circle A, they are arranged annularly at equal intervals as illustrated in FIG. 9.

Figure 10:
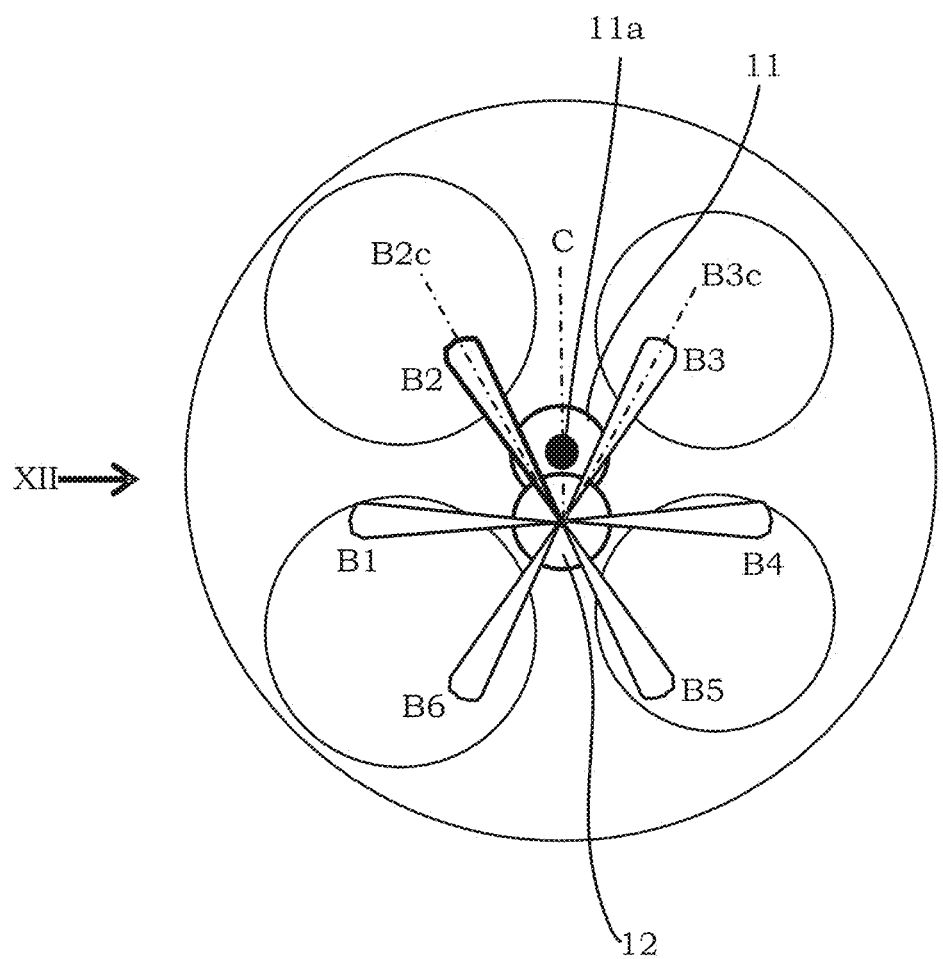
FIG. 10 is a view illustrating a layout of the ignition plug and the fuel injection valve in a first embodiment.

FIG. 10 is a view illustrating the positional relationship between the spray beams B1 to B6 and the ignition plug 11. The fuel injection valve 12 is disposed on a one-dot chain line C which is a bisector line of an angle formed by a center axis B2*c* of the spray beam B2 and a center axis B3*c* of the spray beam B3.

Figure 11:
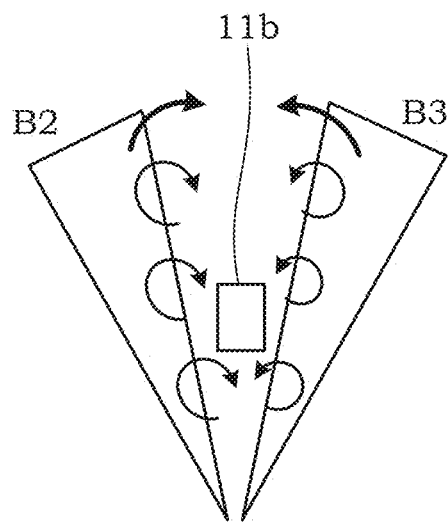
FIG. 11 is a view for explaining a contracted flow.

FIG. 11 is a view for explaining an effect obtained by the layout as in FIG. 10.

The fuel injected from the fuel injection valve 12 is split into droplets and becomes sprays, and they advance while taking in ambient air as indicated by bold arrows in the figure. As a result, turbulence in an air flow is generated around the sprays.

Moreover, when there is an object (including a fluid) around, a fluid is drawn to the object by so-called Coanda effect and flows along the object. That is, in the layout in FIG. 10, the spray beam B2 and the spray beam B3 are drawn to each other as indicated by thin arrows in FIG. 11 and a so-called contracted flow is generated.

As a result, an extremely strong turbulence is generated between the spray beam B2 and the spray beam B3, and the plug discharging channel CN can be extended by this turbulence.

Figure 12:
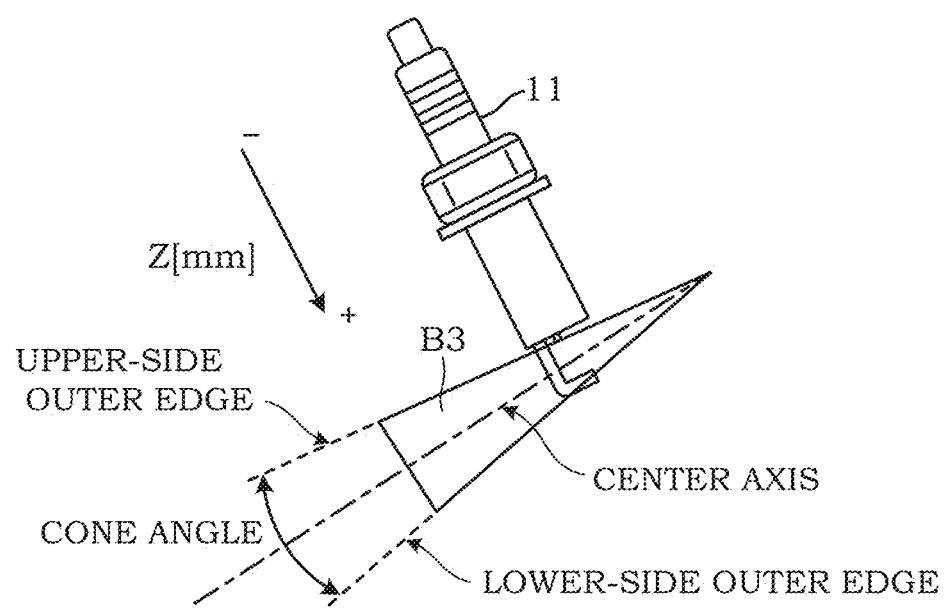
FIG. 12 is a view illustrating a relationship between a discharging region and the spray beam.

FIG. 12 is a view illustrating a positional relationship between the ignition plug 11 and the spray beam B3 when FIG. 10 is seen from a direction of an arrow XII. In FIG. 12, a discharging region sandwiched by the center electrode 11*a* and the outer electrode 11*b* is disposed within a range sandwiched by an outer edge on an upper side in the figure and an outer edge on a lower side in the figure of the spray beam B3. Though not shown, when FIG. 10 is seen from a direction opposite to an arrow XII, the positional relationship between the ignition plug 11 and the spray beam B2 becomes symmetrical to that in FIG. 12, and the discharging region is disposed within a range sandwiched by the outer edge on the upper side and the outer edge on the lower side of the spray beam B2. That is, the ignition plug 11 is disposed so that the discharging region is disposed within a range sandwiched by a plane including the upper-side outer edge of the spray beam B2 and the upper-side outer edge of the spray beam B3 and a plane including the lower-side outer edge of the spray beam B2 and the lower-side outer edge of the spray beam B3.

By employing a layout as above, the aforementioned turbulence in the air flow between the spray beams can be used more effectively in improvement of combustion stability. The aforementioned layout can use the turbulence in the air flow most effectively, but if the discharging region is disposed within the range where the turbulence in the air flow is generated between the adjacent spray beams, the plug discharging channel is extended by the turbulence in the air flow, and an effect of improving combustion stability can be obtained.

Here, a relationship between the position of the ignition plug 11 and the combustion stability will be explained.

Figure 13:
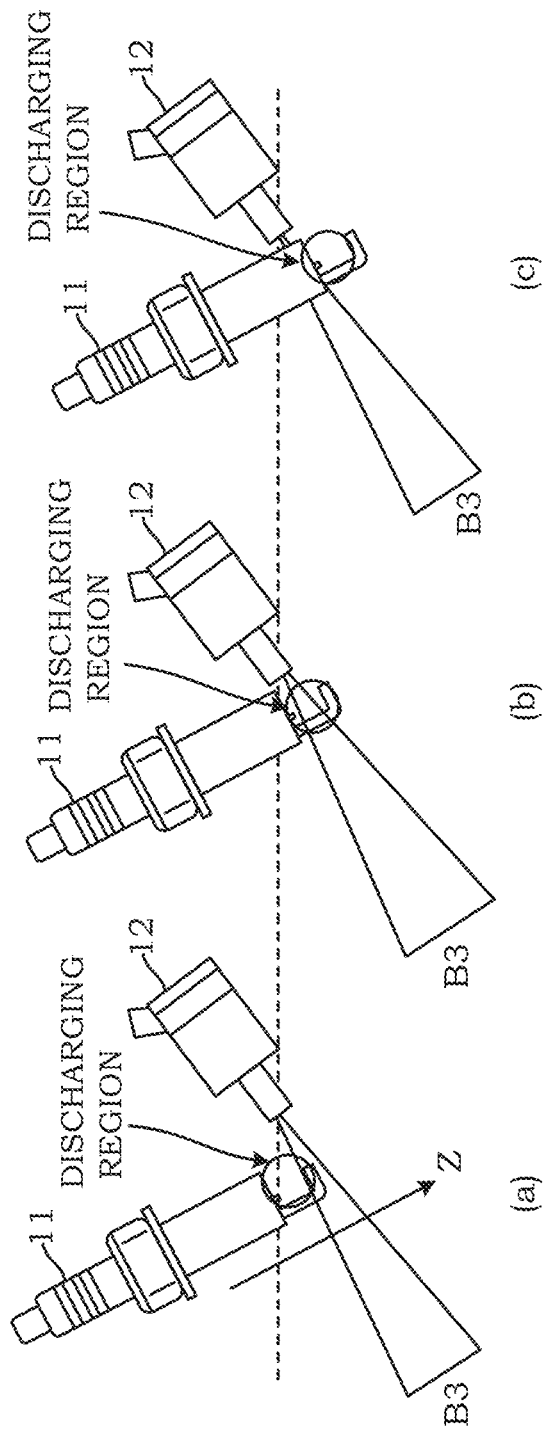
FIG. 13 is a view for explaining a position of the ignition plug and combustion stability.
Figure 14:
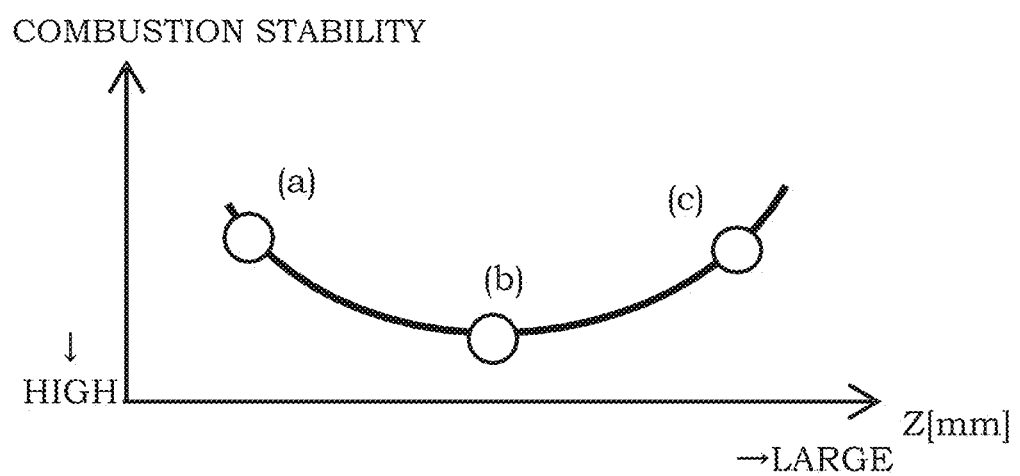
FIG. 14 is a view illustrating a relationship between the position of the ignition plug and combustion stability.

FIG. 13 is a view illustrating a state where the z-direction position of the ignition plug 11 is deviated while the position of the fuel injection valve 12 is fixed. (b) is a layout similar to FIG. 12. (a) is a state where the Z-axis directional position of the ignition plug 11 is deviated to a negative side than (b), and (c) illustrates a state similarly deviated to a positive side. FIG. 14 is a view illustrating a relationship between the Z-axis directional position of the ignition plug 11 and the combustion stability. A vertical axis in FIG. 14 indicates the combustion stability, and the combustion stability becomes higher on the lower side in the figure.

In the case of (a), there is no discharging region within a range sandwiched by a plane including the center axis of the spray beam B2 and the center axis of the spray beam B3 and a plane including the upper-side outer edge of the spray beam B2 and the upper-side outer edge of the spray beam B3. Thus, an influence of the turbulence in the air flow generated between the both spray beams does not reach the discharging region easily. That is, in the layout in (a), the effect of extending the plug discharging channel CN is smaller than that in (b).

In the case of (c), the influence of the turbulence in the air flow does not reach the discharging region similarly to the case of (a), and moreover, there is also a concern that the spray beams B2 and B3 collide against the ignition plug 11. That is, in the layout (c), the effect of extending the plug discharging channel CN is smaller than that in (b).

As a result, as illustrated in FIG. 14, the combustion stability is higher in the case of (b) than the cases of (a) and (c). When the discharging region is disposed within the range sandwiched by the plane including the center axis of the spray beam B2 and the center axis of the spray beam B3 and the plane including the upper-side outer edge of the spray beam B2 and the upper-side outer edge of the spray beam B3 or the plane including the lower-side outer edge of the spray beam B2 and the lower-side outer edge of the spray beam B3, too, the combustion stability closer to the case of (b) can be obtained.

The specific Z-axis directional position is different depending on the fuel injection valve 12 in use. In the case of the fuel injection valve 12 of a so-called multi-hole type, the larger the injection hole diameter is, the larger a cone angle illustrated in FIG. 12 tends to become, and the larger the cone angle is, the smaller the distance between the adjacent spray beams becomes. Thus, if the cone angle is larger than that illustrated in FIG. 12, for example, higher combustion stability can be obtained by shifting the Z-axis directional position of the ignition plug 11 closer to the negative side than the case in FIG. 12.

Figure 15:
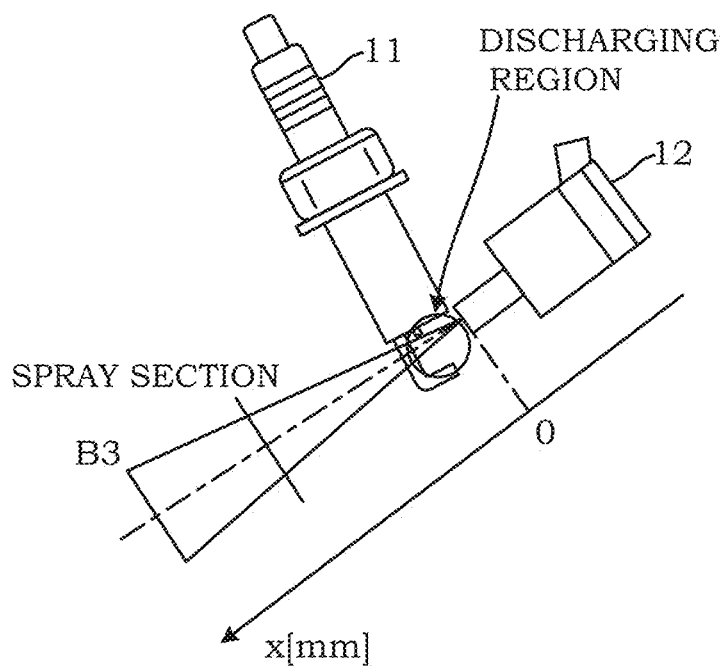
FIG. 15 is a view illustrating a relationship between the discharging region and the spray beam.

Subsequently, the distance from the injection hole of the fuel injection valve 12 to the ignition plug 11 will be explained. The distance here means, as illustrated in FIG. 15, a length in the X-axis direction assuming that the center axis direction of the fuel injection valve 12 is the X-axis and the position of the injection hole is 0.

Figure 16:
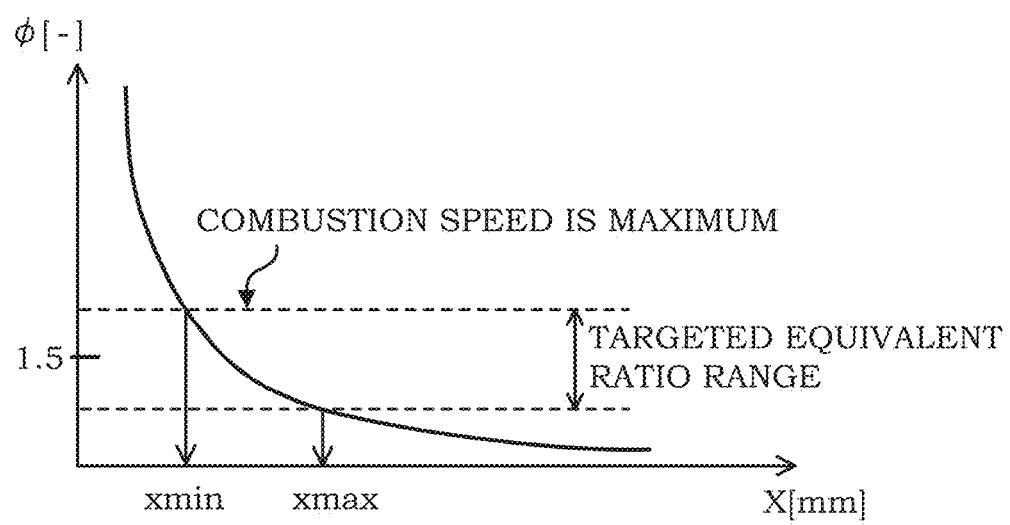
FIG. 16 is a view illustrating a relationship between the position of the ignition plug and an equivalent ratio.

FIG. 16 is a view illustrating a relationship between a distance x in the X-axis direction and a mixing ratio (equivalent ratio $\varphi$) inside the spray of a spray section at the distance x. The equivalent ratio $\varphi$ is a reciprocal number of an air excessive ratio $\lambda$.

As illustrated in FIG. 16, the larger the distance x is, the more the equivalent ratio $\varphi$ inside the spray of the spray section at the distance x decreases. This is as indicated by the kinetics theory (equation (1)) of spray by Waguri et al. relating to exchange of momentums between the fuel spray and the air when the fuel spray advances while catching the ambient air.

[Equation 1]

As in a catalyst warm-up operation, for example, in a combustion form in which a stratified mixture is formed around the ignition plug by expansion stroke injection and ignition is performed during the expansion stroke after the fuel injection, the tumble fluidity has been broken at the ignition timing, and there is no turbulence in the cylinder other than the turbulence in the air flow by the fuel injection for extending the plug discharging channel CN. That is, it can be considered that there is little turbulence in the air flow in view of the entire cylinder. When there is not turbulence in the air flow, laminar burning velocity is dominant in the combustion, and the laminar burning velocity is maximum when the equivalent ratio $\varphi$ is larger than 1. That is, combustion is the easiest. On the other hand, the smaller the equivalent ratio $\varphi$ is, the more difficult burning becomes.

If the equivalent ratio $\varphi$ around the discharging region is not appropriate, even if the plug discharging channel CN is extended by the turbulence in the air flow by the aforementioned fuel spraying, combustion becomes difficult. Thus, a range of the equivalent ratio which can ensure the combustion stability is set as a targeted equivalent ratio range, and the ignition plug 11 is disposed so that the discharging region is located within the range from xmin to xmax which is this targeted equivalent ratio range.

By disposing the ignition plug 11 and the fuel injection valve 12 as explained above, the plug discharging channel CN can be extended by the fuel injection, and the combustion stability can be ensured.

Figure 17:
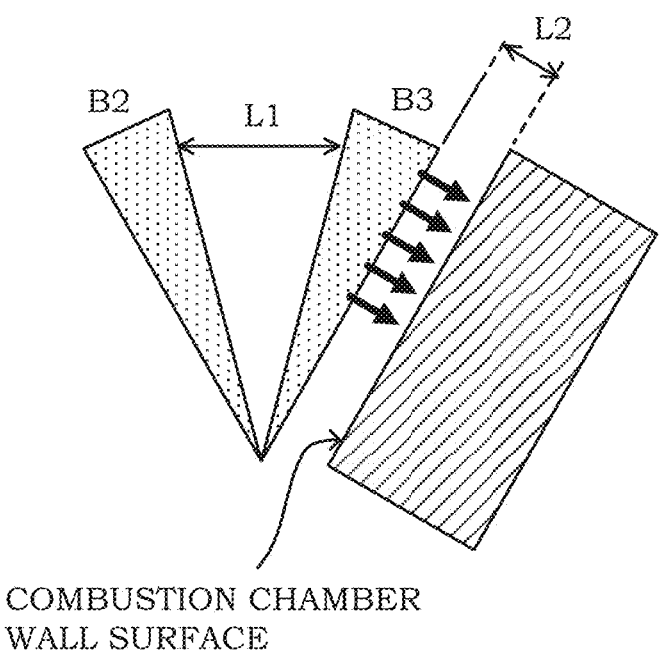
FIG. 17 is a view illustrating a case where a combustion chamber wall surface is located at a position closer than the adjacent spray beam.

In the aforementioned layout of the ignition plug 11 and the fuel injection valve 12, it is based on a fact that the distance (distance between spraying wall surfaces) from the spray beam B2 or the spray beam B3 to a wall surface (including a ceiling surface) of the combustion chamber is longer than a distance (inter-spray distance) between the spray beam B2 and the spray beam B3. This is due to the following reason. If an inter-spray distance L1 is shorter than an inter-spray distance L2 between the spray wall surfaces from the spray beam B3 to the combustion chamber wall surface, the spray beam B3 is drawn to the combustion chamber wall surface more strongly than the spray beam B2 as illustrated in FIG. 17. As a result, the turbulence in the air flow is no longer be generated easily between the spray beam B2 and the spray beam B3, and the effect of extending the plug discharging channel CN can no longer obtained easily. The inter-spray distance L1 is a distance between the opposing spray beam outer edges and becomes longer as it goes away from the injection hole.

Subsequently, control for extending the plug discharging channel CN will be explained.

Figure 18:
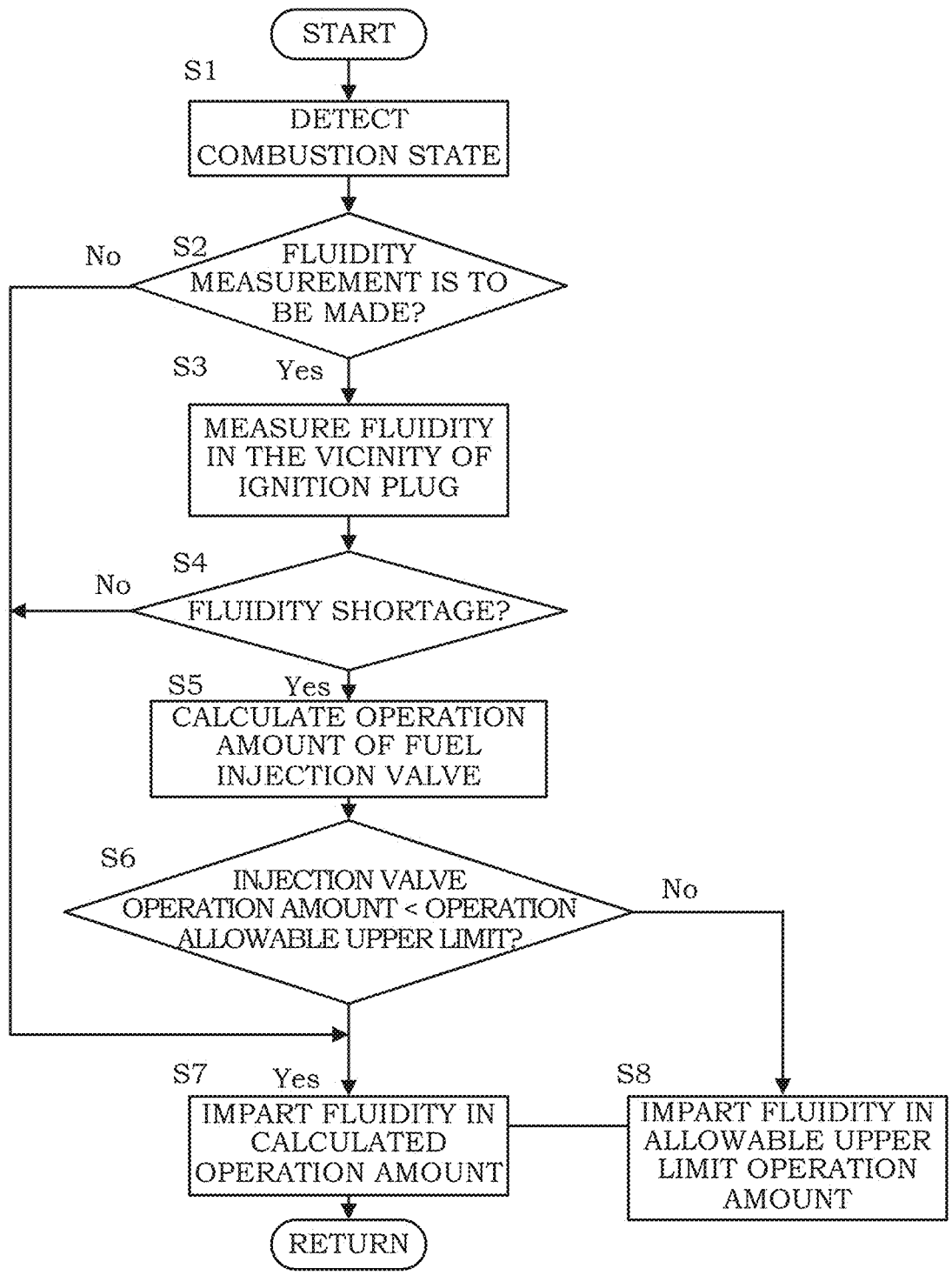
FIG. 18 is a flowchart of plug discharging channel extension control.

FIG. 18 is a flowchart of control of extending the plug discharging channel. This routine is repeatedly executed by the controller 50 at a short interval of approximately 10 milliseconds, for example.

The controller 50 detects a combustion state of the internal combustion engine 10 (S1). The combustion state of the internal combustion engine 10 can be detected on the basis of rotation speed fluctuation of the internal combustion engine 10 for example. At this time, if the rotation speed fluctuation of the internal combustion engine 10 is smaller than a predetermined amount, it can be determined that the combustion state of the internal combustion engine 10 is favorable. The rotation speed fluctuation of the internal combustion engine 10 can be acquired on the basis of an output from the crank angle sensor 27.

The combustion state of the internal combustion engine 10 may be detected on the basis of the in-cylinder pressure fluctuation obtained from the in-cylinder pressure sensor 35 provided in the internal combustion engine 10. In this case, when the in-cylinder pressure fluctuation is smaller than a predetermined amount, it can be determined that the combustion state of the internal combustion engine 10 is favorable. Moreover, by providing a torque sensor, the combustion stability may be detected on the basis of torque fluctuation. Alternatively, by providing an ion sensor, the combustion stability may be detected on the basis of fluctuation of ion concentration.

Subsequently, the controller 50 determines whether fluidity measurement is to be made or not (S2). Whether the fluidity measurement is to be made or not can be determined on the basis of the combustion state of the internal combustion engine 10 acquired at Step S1. Then, if the combustion state of the internal combustion engine 10 is not favorable, the controller 50 measures fluidity in the vicinity of the ignition plug 11 at the subsequent step (S3). Specifically, the flow velocity in the vicinity of the ignition plug 11 is measured. On the other hand, if the combustion state of the internal combustion engine 10 is favorable, this control is finished.

Whether the fluidity measurement is to be made may be determined on the basis of an EGR rate. Specifically, when the EGR rate is higher than a predetermined value, it can be determined that the fluidity measurement is to be made. This is because when the EGR rate is high, misfire or partial burn can occur easily.

Moreover, whether the fluidity measurement is to be made can be determined such that, when an A/F value is higher than a predetermined value in a lean-burn operation, that is, when the operation is being performed with the air-fuel ratio closer to a lean side than the predetermined value, the fluidity measurement is made. This is because, even if the operation is being performed on the lean side, misfire or partial burn can occur easily.

At Step S3, the controller 50 measures the fluidity in the vicinity of the ignition plug 11. The fluidity measurement is made in a second half of the compression stroke. The flow velocity sensor for measuring the fluidity in the vicinity of the ignition plug 11 can be constituted as follows by using the ignition plug 11, for example.

An ammeter for measuring a current value flowing through the center electrode 11a of the ignition plug 11 is provided. Moreover, an ammeter for measuring a current value flowing through the outer electrode 11b of the ignition plug is provided. Then, at timing for measuring the flow velocity in the vicinity of the ignition plug 11, an electric field with a short pulse is imparted to a space between the center electrode 11a and the outer electrode 11b. This electric field with a short pulse is a weak electric field to such a degree that does not cause spark ignition.

When a voltage is applied to a space between the electrodes 11a and 11b, electrons are emitted from the center electrode 11a. The emitted electrons flow by the fluidity between the electrodes 11a and 11b. The faster the flow velocity is, the more electrons do not reach the outer electrode 11b. Thus, the faster the flow velocity is, the smaller the current measured on the outer electrode 11b side becomes than the current measured on the center electrode 11a side.

A relationship between a difference between these current values and the flow velocity is acquired in advance. Then, a short pulse is applied to a space between the electrodes 11a and 11b at timing when the flow velocity is acquired. Then, by acquiring a difference between the current value of the center electrode 11a and the current value of the outer electrode 11b, the flow velocity can be acquired.

Figure 19:
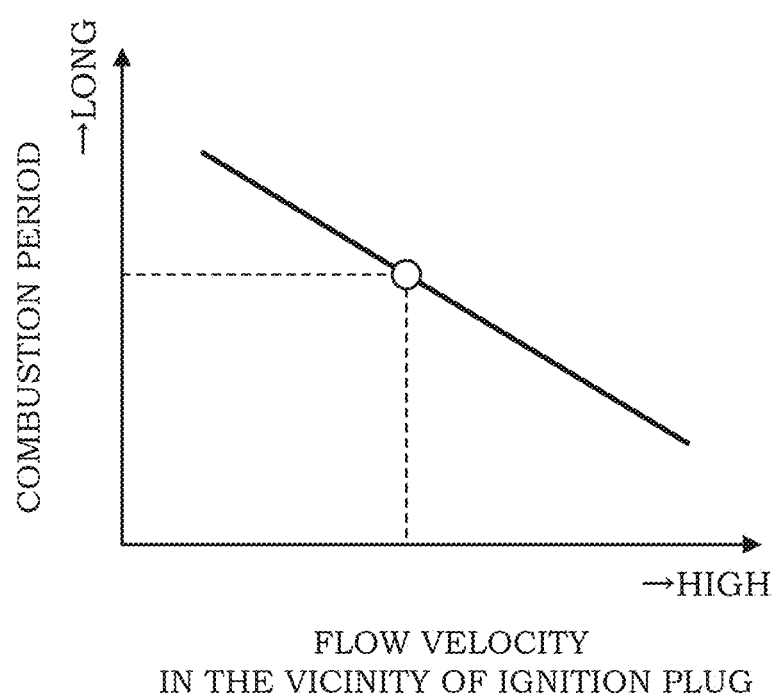
FIG. 19 is a view illustrating a relationship between a flow velocity in the vicinity of the ignition plug and a combustion period.

FIG. 19 is a view illustrating a relationship between the flow velocity in the vicinity of the ignition plug and the combustion period. In a graph in FIG. 19, a lateral axis indicates a flow velocity in the vicinity of the ignition plug 11 and a vertical axis indicates a combustion period. The faster the flow velocity in the vicinity of the ignition plug 11 is, the faster the combustion speed is and thus, it has a relationship that the combustion period becomes short. If the combustion period becomes longer than a certain length, combustion cannot be completed. Thus, an adaptive value is present for the combustion period. In order that the combustion period does not become longer than this adaptive value, if the measured flow velocity is lower than the flow velocity corresponding to this adaptive value, it is determined that the flow velocity is insufficient, and the fluidity is imparted.

For that purpose, the controller 50 determines whether the fluidity is insufficient or not (S4). Whether the fluidity is insufficient or not can be determined on the basis of whether the measured flow velocity is slower than a predetermined speed or not. Here, the predetermined speed is a flow velocity in the vicinity of the ignition plug 11 corresponding to the aforementioned adaptive value. Then, if it is determined that the measured flow velocity is smaller than the predetermined speed and the fluidity is insufficient, the controller 50 calculates an operation amount of the fuel injection valve 12 (S5).

Figure 20:
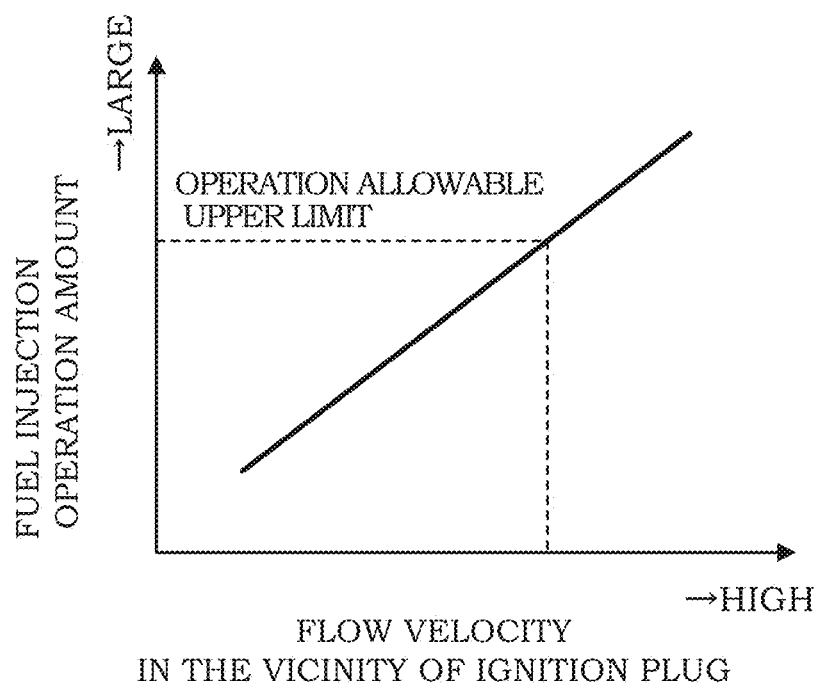
FIG. 20 is a view illustrating a relationship between the flow velocity in the vicinity of the ignition plug and an operation amount of the fuel injection valve.

FIG. 20 is a view illustrating a relationship between the flow velocity in the vicinity of the ignition plug and the operation amount of the fuel injection valve. In a graph in FIG. 20, a lateral axis indicates a flow velocity in the vicinity of the ignition plug and a vertical axis indicates an operation amount of the fuel injection valve. Then, an operation amount allowable upper limit is indicated in the predetermined operation amount of the fuel injection valve.

If the calculated operation amount is too large, injection of the fuel in that operation amount causes insufficient mixing of the fuel in some cases. If mixing of the fuel is insufficient, exhaust performances deteriorate. Thus, the operation amount allowable upper limit is set so that the fuel to such a degree that does not cause insufficient mixing of the fuel is injected.

If the calculated injection valve operation amount is less than the operation allowable upper limit, the controller 50 causes the fuel injection valve to inject the fuel in the calculated operation amount (S7). Then, fluidity is imparted to the vicinity of the ignition plug. At this time, it is preferable that fuel injection timing which can impart the largest fluidity with respect to the spark ignition timing is calculated and the fluidity is imparted by injecting the fuel at the calculated fuel injection timing.

On the other hand, if the calculated fuel injection valve operation amount is not less than the operation allowable upper limit, the controller 50 causes the fuel injection valve 12 to inject the fuel in the allowable upper limit operation amount (S8). Then, the controller 50 causes the fuel injection valve 12 to impart fluidity in the operation amount as large as possible.

By configuring as above, even if the tumble fluidity is broken and the fluidity in the vicinity of the ignition plug is not sufficient, the fluidity can be imparted, and the plug discharging channel CN can be extended so as to improve combustion stability. Moreover, at EGR, since misfire and partial burn can be suppressed, high EGR combustion can be realized.

In the aforementioned embodiment, the fluidity is imparted in a cycle in which the flow velocity in the vicinity of the ignition plug is insufficient. However, the fluidity may be imparted at each cycle. Particularly, in the lean-burn operation, the fluidity imparting may be performed at each cycle. By configuring as above, a flame propagation speed of a lean mixture is ensured, and occurrence of misfire and partial burn in the lean-burn operation can be suppressed.

Moreover, when such a cycle in which the fluidity is statistically weakened at a predetermined probability is generated as the result of analysis, the fluidity may be imparted in that cycle.

Figure 21:
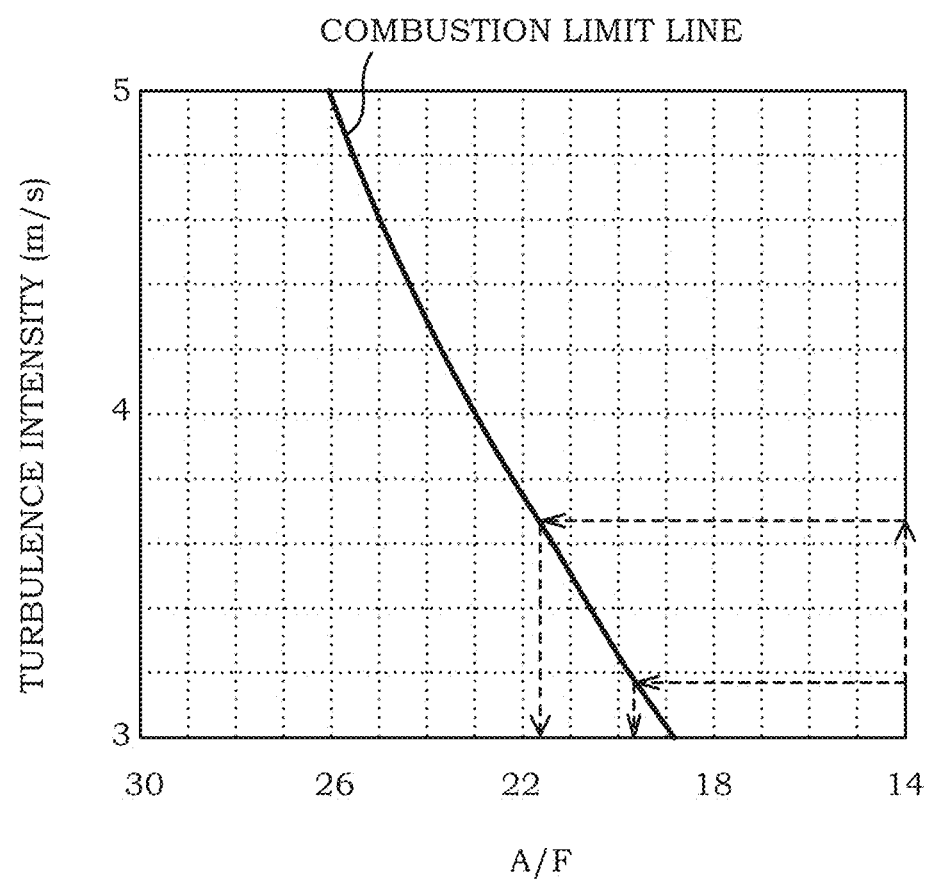
FIG. 21 is an explanatory view of an effect of A/F proof stress improvement by fluidity imparting.

FIG. 21 is an explanatory view of an effect of A/F proof stress improvement by fluidity imparting. In a graph in FIG. 21, a lateral axis indicates an A/F (air-fuel ratio), and a vertical axis indicates a turbulence intensity. Here, the A/F proof stress improvement means that combustion can be performed stably in a leaner state. Moreover, in the graph in FIG. 21, a combustion limit line with respect to the turbulence intensity is indicated. In FIG. 21, stable combustion is difficult on the left side of the combustion limit line.

In FIG. 21, when the turbulence intensity is approximately 3.2 (m/s), the combustion limit A/F is approximately 19.5. On the other hand, when the turbulence intensity is raised to approximately 3.8 (m/s) by imparting fluidity, the combustion limit A/F improves up to 21.5. That is, A/F proof stress is improved.

As described above, fuel injection can impart fluidity to the vicinity of the plug. As a result, the turbulence intensity in the cylinder is also reinforced, and the plug discharging channel CN is extended and thus, the A/F proof stress improvement effect as illustrated in FIG. 21 can be obtained.

Moreover, the aforementioned control may be executed in an internal combustion engine including a supercharger and performing supercharging lean-burn. At this time, a right-above injection valve may be provided in each cylinder as described above and a multi-port injection in which injection is provided at an intake port of each cylinder may be employed. Moreover, the right-above injection valve may be provided in each cylinder, and a side injection valve may be provided in each cylinder.

Figure 22:
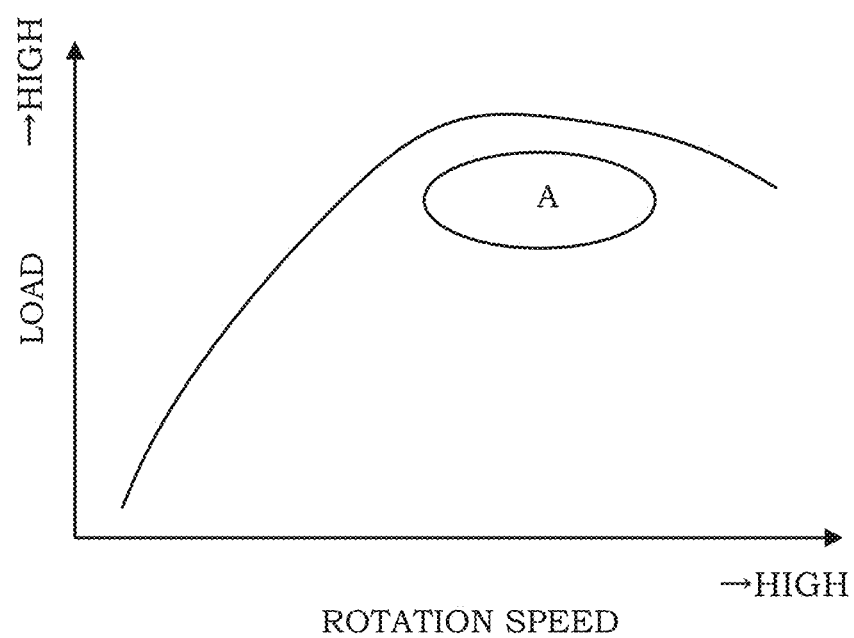
FIG. 22 is an explanatory view of an operation region to which this embodiment is applied.

FIG. 22 is an explanatory view of an operating region to which this embodiment is applied. In a graph in FIG. 22, a lateral axis indicates a rotation speed of an internal combustion engine and a vertical axis indicates a load. In order to improve homogeneity of the mixture and to obtain the effect of the turbulence increase as in this embodiment, it is preferable that a fuel pressure can be increased and a fuel injection amount immediately before ignition is small. In a region where the internal combustion engine speed and the load are high, the fuel injection amount becomes large. Thus, multi-stage injection can be performed with a high pressure. Thus, this embodiment can be effectively applied in a lean-boost region (region A in the figure).

When the fuel injection is performed in the compression stroke as described above, the air-fuel ratio of the mixture in the combustion chamber can be richer than a stoichiometric air-fuel ratio in some cases. Measurement of a flow velocity is made in a second half of the compression stroke. In the case of the multi-stage injection and when fuel injection is performed before the compression stroke, the fuel injection in an amount which realizes the stoichiometric air-fuel ratio might have been completed before the compression stroke. At this time, if the fuel injection is additionally performed after the breakage of the tumble fluidity, the air-fuel ratio of the mixture in one cylinder becomes richer than the stoichiometric air-fuel ratio.

In such a case, the controller 50 controls the fuel injection amount so that the air-fuel ratio of the mixture in the other cylinders becomes leaner than the stoichiometric air-fuel ratio. Then, it controls the fuel injection amount so that the air-fuel ratio of the total mixture in a plurality of the cylinders becomes the stoichiometric air-fuel ratio. If one cylinder in four cylinders has an air-fuel ratio richer than the stoichiometric air-fuel ratio, for example, the air-fuel ratio in the remaining three cylinders is made leaner than the stoichiometric air fuel ratio. Then, the fuel injection amount is controlled so that the air-fuel ratio in the four cylinders in general becomes the stoichiometric air-fuel ratio. By performing as above, the three-way catalyst can be made to work effectively, and exhaust performances can be also improved.

When the fuel is injected after the breakage of the tumble fluidity at each cycle without measuring the flow velocity, an injection amount can be determined in advance in each injection of the multi-stage injection. Thus, in this case, the air-fuel ratio of the mixture in 1 cycle is made to take the stoichiometric air-fuel ratio in each cylinder by adjusting an injection amount of each injection. By performing as above, the three-way catalyst can be made to work effectively, and exhaust performances can be also improved.

In the aforementioned embodiment, the flow velocity is measured by using the ignition plug 11, but a measurement method of the flow velocity is not limited to the aforementioned method. The flow velocity may be measured by a flow velocity meter provided in the cylinder, for example. Alternatively, the flow velocity may be measured on the basis of detection of an ion current in the cylinder or fluctuation of the in-cylinder pressure sensor 35.

Moreover, when the plug discharging channel CN is to be extended, a discharging voltage of the ignition plug 11 may be raised. If the plug discharging channel CN can be extended, the fluidity may be imparted not before generation of the plug discharging channel but at generation of the plug discharging channel.

The fuel injection for fluidity imparting is performed in the compression stroke. A restriction condition of fuel injection timing in the compression stroke is inhomogeneity of the mixture. If the fuel injection is performed at timing too late, combustion stability is lost due to inhomogeneity of the mixture. Thus, robustness may be increased by executing feedback control of the timing of fuel injection for fluidity imparting on the basis of the combustion stability.

Subsequently, an effect of this embodiment will be explained.

As described above, in this embodiment, the internal combustion engine including the fuel injection valve 12 which has a plurality of injection holes and directly injects a fuel into the cylinder and the ignition plug 11 which ignites the injected fuel is controlled so as to perform the fuel injection from the fuel injection valve 12, and spark ignition is performed while turbulence in the air flow is generated by the fuel injection by the ignition plug 11 disposed so that the discharging region is sandwiched by the fuel sprays injected from the two adjacent injection holes and located within the range where the turbulence in the air flow is generated. The contracted flow is generated in the two fuel sprays by an entrainment effect taking in an ambient air, and the turbulence in the air flow generated by that extends the plug discharging channel, whereby flame propagation is promoted. As a result, combustion stability is improved.

Moreover, in this embodiment, when retard combustion is performed by fuel injection during the expansion stroke, the spark ignition is performed by the ignition plug while the turbulence in the air flow is generated by the fuel injection. The retard combustion here is a fuel form in which the spark ignition is performed during the expansion stroke after the fuel injection during the expansion stroke. This embodiment can be also applied to a case where a stratified mixture is generated around the ignition plug by the expansion stroke injection, and the ignition is performed during the expansion stroke as in the lean-burn operation for promoting warm-up of the catalyst, for example. That is, after the stratified mixture is formed around the ignition plug by the expansion stroke injection, the fuel injection is further performed and spark ignition is performed by the ignition plug while the turbulence in the air flow is generated by the latter fuel injection. In the lean-burn operation, since the ignition timing is retarded to the expansion stroke and the internal combustion engine 10 is at a low temperature, which is a disadvantageous state for combustion, but by applying this embodiment, combustion stability can be improved.

Second Embodiment

This embodiment is similar to the first embodiment in terms of basic configuration and control of extending the plug discharging channel, but forms of spray beams B1 to B6 are different from the first embodiment.

Figure 23:
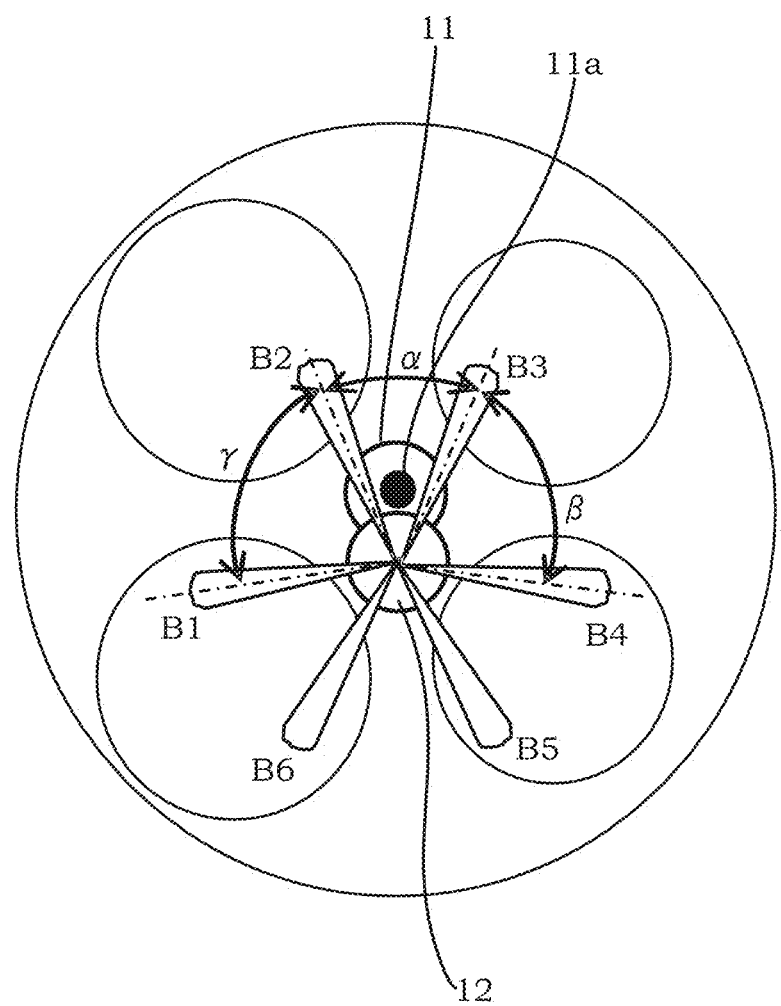
FIG. 23 is a view illustrating a layout of an ignition plug and a fuel injection valve in a second embodiment.

FIG. 23 is a view illustrating a positional relationship between the spray beams B1 to B6 and the ignition plug 11 in this embodiment.

In the first embodiment, the spray beams B1 to B6 are formed at equal intervals, but in this embodiment, an angle α formed by the spray beam B2 and the spray beam B3 is smaller than an angle γ formed by the spray beam B2 and the spray beam B1 and an angle β formed by the spray beam B3 and the spray beam B4. The angle formed by two spray beams is an angle between center axes of the respective spray beams.

As a result, the spray beam B2 is drawn to the spray beam B3 more strongly than the spray beam B1, and the spray beam B3 is drawn to the spray beam B2 more strongly than the spray beam B4. As a result, as compared with the case where the respective spray beams B1 to B6 are formed at equal intervals, a contracted flow between the spray beam B2 and the spray beam B3 is promoted, and the stronger turbulence in an air flow can be generated.

As described above, in this embodiment, the angle formed by two fuel sprays (spray beams B2 and B3) sandwiching the discharging region is smaller than the angle formed by each of the two fuel sprays and another adjacent fuel spray (spray beams B1 and B4). As a result, a contracted flow can be generated more easily between the two fuel sprays sandwiching the discharging region, and larger turbulence in an air flow can be generated.

Third Embodiment

This embodiment is similar to the first embodiment in terms of basic configuration and control for extending the plug discharging channel, but a positional relationship between the spray beam B2 and the spray beam B3 sandwiching the ignition plug 11 is different from the first embodiment.

Figure 24:
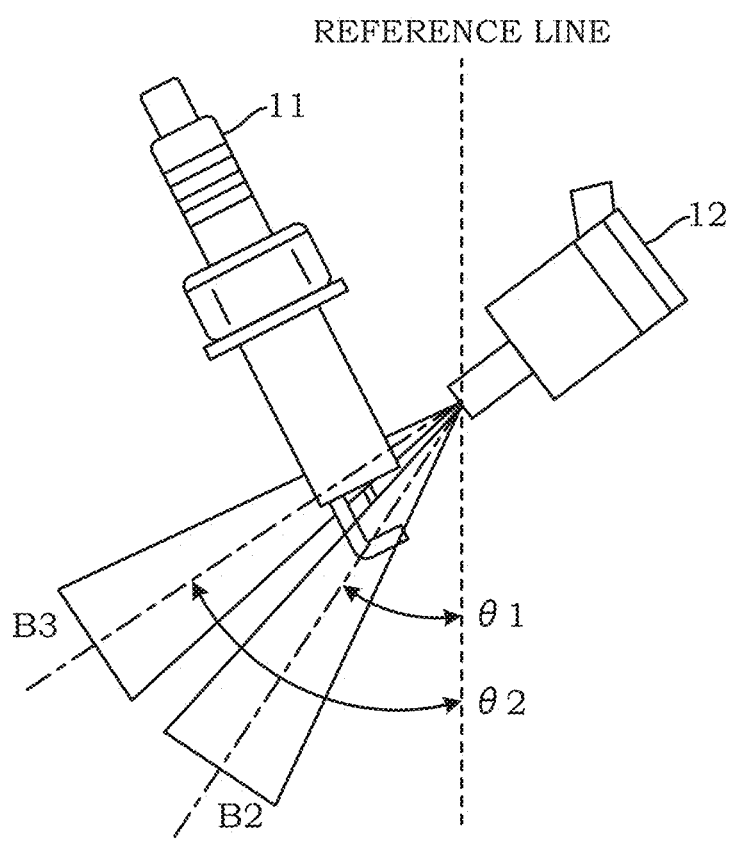
FIG. 24 is a view illustrating a relationship between a spray beam and a discharging region in a third embodiment.

In the first embodiment, when seen from an arrow XII direction in FIG. 10, the spray beam B2 and the spray beam B3 overlap each other. However, in this embodiment, assuming that an angle formed by a reference line in parallel with a cylinder axis and passing through an injection hole and the spray beam B2 is θ1 and an angle formed by the reference line and the spray beam B3 is θ2 as illustrated in FIG. 24, it is θ1≠θ2.

When a mechanism for maintaining one of the intake valves in a closed valve state without operating it in accordance with the operating state is provided in an intake double-valve internal combustion engine 10 or when in-cylinder fluidity is in a state in which a tumble flow and a swirl flow are mixed, the aforementioned spray form is employed in some cases in order to promote mixing between air and a fuel.

Even in the case of θ1≈θ2 as above, an idea of setting the positional relationship between the ignition plug 11 and the fuel injection valve 12 is similar.

That is, the position of the ignition plug 11 in the Z-axis direction is set so that a plane including the center axis of the spray beam B2 and the center axis of the spray beam B3 and a plane including the upper-side outer edge of the spray beam B2 and the upper-side outer edge of the spray beam B3 pass through the discharging region.

Moreover, the distance x in the X-axis direction between the ignition plug 11 and the fuel injection valve 12 is set, by setting a range of the equivalent ratio which can ensure combustion stability as a targeted equivalent ratio range, so that the discharging region is located within the range from xmin to xmax which is this targeted equivalent ratio range.

As described above, in this embodiment, the two fuel sprays sandwiching the discharging region have angles formed with the cylinder axis different from each other. As a result, the effect can be obtained that the combustion stability is improved by extending the plug discharging channel in accordance with various operating forms that can be taken by the internal combustion engine 10.

Fourth Embodiment

Even if the layout of the ignition plug 11 and the fuel injection valve 12 is set as explained in the first embodiment to the third embodiment, the layout according to the setting cannot be obtained in some cases due to a manufacturing error, variation in assembling processes and the like. If the layout according to the setting is not obtained, the combustion stability lowers.

Figure 25:
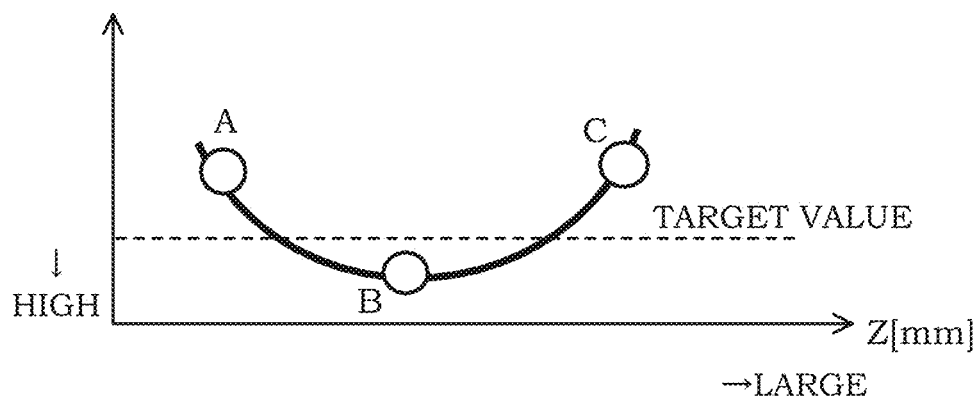
FIG. 25 is a view for explaining a position of the ignition plug and combustion stability.

If a threaded portion of the ignition plug 11 is shorter than a specified value due to a manufacturing error, for example, the position in the Z-axis direction of the ignition plug 11 is deviated to the negative direction from the set layout (point A in FIG. 25). If the ignition plug 11 is tightened too much in the assembling process, the position in the Z-axis direction of the ignition plug 11 is deviated to the positive direction from the set layout (point C in FIG. 25). In either case, the combustion stability lowers as compared with a case according to the set layout (point B in FIG. 25). A "target value" in FIG. 25 is set as combustion stability without a problem in operation of the internal combustion engine 10.

Figure 26:
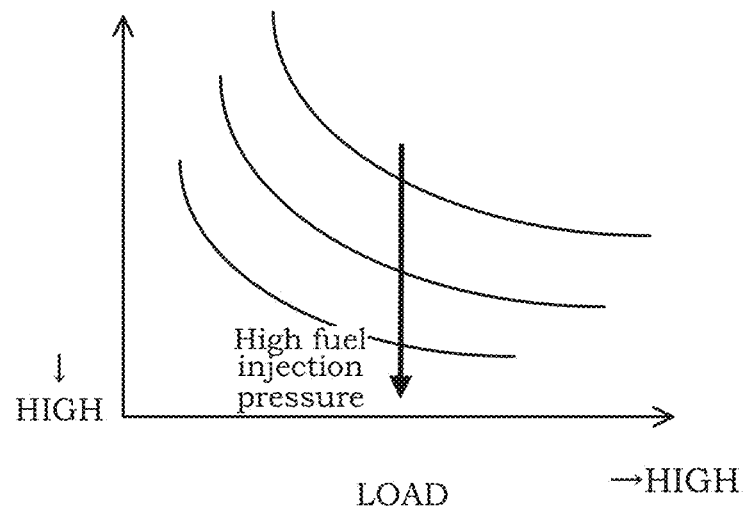
FIG. 26 is a view illustrating a relationship between the combustion stability and a fuel injection pressure.

FIG. 26 is a view illustrating a relationship among a load, combustion stability, and a fuel injection pressure (also referred to as a fuel pressure) of the internal combustion engine 10, and a vertical axis indicates combustion stability, a lateral axis indicates a load, and a curve in the figure indicates an equal fuel pressure line. As illustrated in FIG. 26, when the load of the internal combustion engine 10 is constant, the combustion stability has sensitivity to the fuel injection pressure (also referred to as a fuel pressure).

Thus, in this embodiment, a control routine explained below is executed during an operation of the internal combustion engine 10 so that the combustion stability satisfies the target value even if there is the aforementioned manufacturing error or the like.

Figure 27:
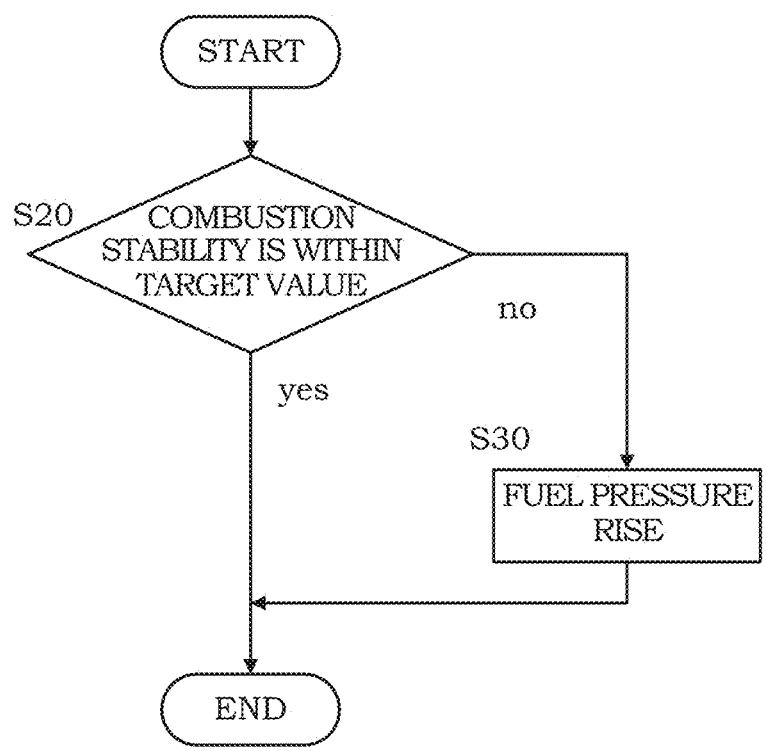
FIG. 27 is a flowchart illustrating a control routine in a fourth embodiment.

FIG. 27 is a flowchart illustrating the control routine executed by the controller 50.

When the internal combustion engine 10 is operated, the controller 50 determines whether the combustion stability satisfies the target value or not (S20). The combustion stability is obtained by searching a map prepared in advance by using a detection signal of the knock sensor 21 included in the internal combustion engine 10, for example. Alternatively, an illustrated average effective pressure Pi can be calculated on the basis of a detected value of the in-cylinder pressure sensor 35, and the combustion stability can be obtained on the basis of its cycle variation.

When the controller 50 determines at Step S20 that the combustion stability satisfies the target value, it finishes the routine this time, while if it determines that the target value is not satisfied, it executes processing at Step S30.

At Step S30, the controller 50 raises the fuel pressure. A rise amount can be set on the basis of a map prepared in advance on a relationship illustrated in FIG. 26 for example.

As described above, in this embodiment, whether the combustion is stable or not is determined, and if it is not stable, the fuel injection pressure is raised. Whether the combustion stability has reached the target value set in advance or not is determined, and if the target value is not reached, the fuel pressure is raised, for example. By raising the fuel pressure, the flow velocity of the fuel spray is increased, and the turbulence in the air flow is increased and thus, even if the fuel spray deviates from the position of the discharging region due to the manufacturing error or variation in the assembling process, the effect that the combustion stability is improved by extending the plug discharging channel can be obtained.

Figure 28:
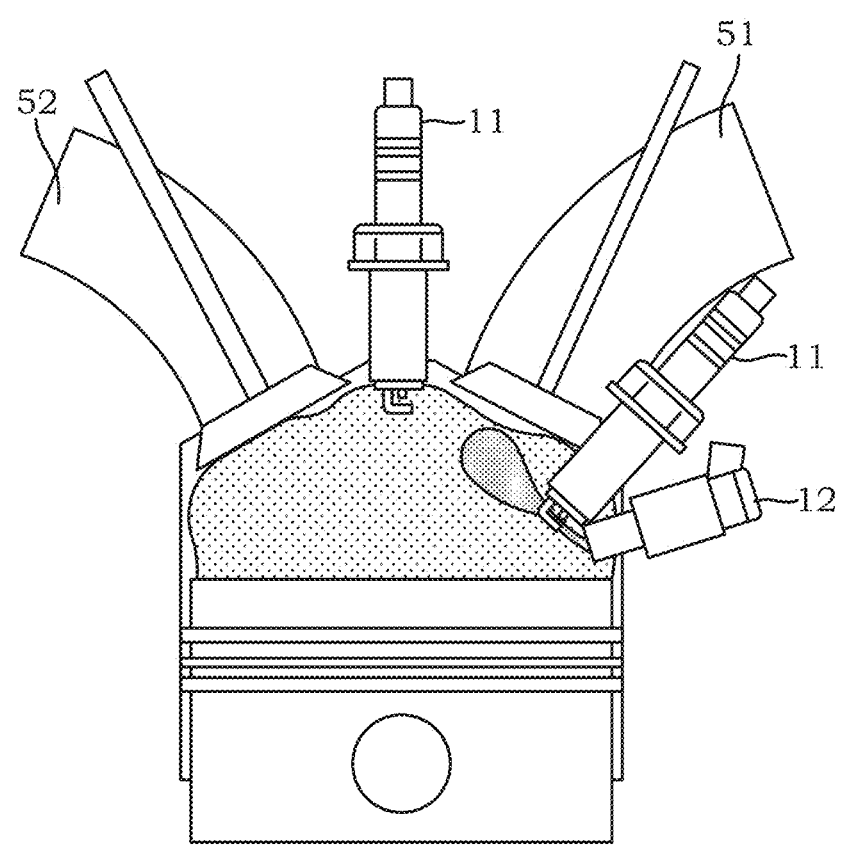
FIG. 28 is a view illustrating another example of an internal combustion engine to which the first embodiment to the fourth embodiment can be applied.

The embodiments of the present invention have been explained, but the aforementioned embodiments illustrate only a part of application examples of the present invention and are not intended to limit the technical range of the present invention to the specific configuration of the aforementioned embodiments. For example, the case of the so-called immediately-above injection type in which the fuel injection valve 12 is disposed in the vicinity of a center on the ceiling surface of the combustion chamber is explained in each embodiment, but this is not limiting. As illustrated in FIG. 28, in addition to the ignition plug 11 at the center on the ceiling surface, the present invention can be also applied similarly to such configuration that the ignition plug 11 is included on a side wall portion of the combustion chamber, and the fuel injection valve 12 is included in the vicinity of the ignition plug 11 on the side wall portion, for example. Moreover, in addition to the fuel injection valve 12 facing the combustion chamber, the present invention can be also applied to an internal combustion engine including a fuel injection valve facing the intake passage 51.

Each of the aforementioned embodiments is explained as single embodiment, respectively, but they may be combined as appropriate.

[Equation 1]

$$\lambda \approx (2\tan\theta/L_{th}\sqrt{c})\sqrt{\rho_a/\rho_f}\,(x/d)\,\Lambda \quad (1)$$

$\lambda$: air-fuel ratio
$L_{th}$: stoichiometric air-fuel ratio
$\rho_a$: atmospheric (air) density
$\rho_f$: fuel density
$x$: spray reaching distance
$d$: injection hole diameter
$\theta$: spray angle
$c$: coefficient

The invention claimed is:

1. A control method of an internal combustion engine, comprising:
    injecting fuel directly into a cylinder with a fuel injection valve having a plurality of injection holes from which a corresponding plurality of fuel sprays are injected, wherein fuel injection is performed from the fuel injection valve and the fuel injection valve injects fuel through each of the plurality of injection holes so that cross sections of the plurality of fuel sprays, when cut in a plane perpendicular to a central axis of the fuel injection valve, line up in a circular pattern;
    igniting the injected fuel with an ignition plug; and
    performing spark ignition by the ignition plug while a turbulence in an air flow is generated by the fuel injection during an expansion stroke, the ignition plug being disposed so that a discharging region is sandwiched by a first fuel spray and a second fuel spray of the plurality of fuel sprays, the first fuel spray and the second fuel spray being injected from two of the plurality of injection holes that are adjacent,
    wherein an angle formed by the first fuel spray and the second fuel spray is smaller than:
        an angle formed between a third fuel spray and the first fuel spray wherein the third fuel spray is adjacent to the first fuel spray in a circumferential direction, and
        an angle formed between a fourth fuel spray and the second fuel spray wherein the fourth fuel spray is adjacent to the second fuel spray in the circumferential direction, and
    wherein the ignition plug is disposed so that a plane including a central axis of the first fuel spray and a central axis of the second fuel spray passes between a center electrode and an outer electrode of the ignition plug.

2. The control method of the internal combustion engine according to claim 1, wherein
    whether combustion is stable or not is determined; and
    if the combustion is not stable, a fuel injection pressure is raised.

3. The control method of the internal combustion engine according to claim 1, wherein
    the first fuel spray and the second fuel spray sandwiching the discharging region have angles formed with a cylinder axis, respectively, different from each other.

4. The control method of the internal combustion engine according to claim 1, wherein
    a distance between the first fuel spray and the second fuel spray is shorter than both (i) a distance between the first fuel spray and a wall surface of a combustion chamber of the internal combustion engine, and (ii) a distance between the second fuel spray and the wall surface of the combustion chamber of the internal combustion engine.

5. A control device of an internal combustion engine, comprising:
    a fuel injection valve having a plurality of injection holes and adapted to directly inject a fuel into a cylinder via a plurality of fuel sprays injected from the plurality of injection holes;
    an ignition plug adapted to ignite the injected fuel; and
    a controller, wherein
    the fuel injection valve is adapted to inject the fuel through each of the plurality of injection holes so that cross sections of the plurality of fuel sprays, when cut in a plane perpendicular to a central axis of the fuel injection valve, line up in a circular pattern, the fuel injection valve and the ignition plug are disposed so that a discharging region of the ignition plug is sandwiched by a first fuel spray and a second fuel spray of the plurality of fuel sprays, the first fuel spray and the second fuel spray being injected from two of the plurality of injection holes that are adjacent, and wherein the ignition plug is disposed so that a plane including a central axis of the first fuel spray and a central axis of the second fuel spray passes between a center electrode and an outer electrode of the ignition plug;

an angle formed by the first fuel spray and the second fuel spray sandwiching the discharging region is smaller than:
- an angle formed between a third fuel spray and the first fuel spray wherein the third fuel spray is adjacent to the first fuel spray in a circumferential direction, and
- an angle formed between a fourth fuel spray and the second fuel spray wherein the fourth fuel spray is adjacent to the second fuel spray in the circumferential direction; and the controller is adapted to perform spark ignition by the ignition plug while fuel injection is performed during an expansion stroke and while a turbulence in an air flow is generated by the fuel injection during the expansion stroke.

* * * * *